(12) United States Patent
Sauvageau et al.

(10) Patent No.: US 11,299,220 B2
(45) Date of Patent: Apr. 12, 2022

(54) TRACK ASSEMBLY FOR A TOWED VEHICLE

(71) Applicant: SOUCY INTERNATIONAL INC., Drummondville (CA)

(72) Inventors: Yves Sauvageau, Drummondville (CA); Francois Laflamme, St-Germain-de-Grantham (CA); Branislav Nanac, Drummondville (CA); Patrick Gauthier, Blainville (CA); Eric Halstead, Sainte-Marie-Madeleine (CA); Marc Nadeau, Drummondville (CA); Philippe Martineau-Rousseau, Windsor (CA); David Barry, Longueuil (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 179 days.

(21) Appl. No.: 16/619,787

(22) PCT Filed: Jul. 11, 2018

(86) PCT No.: PCT/IB2018/055123
§ 371 (c)(1),
(2) Date: Dec. 5, 2019

(87) PCT Pub. No.: WO2019/012453
PCT Pub. Date: Jan. 17, 2019

(65) Prior Publication Data
US 2020/0122796 A1 Apr. 23, 2020

Related U.S. Application Data
(60) Provisional application No. 62/530,937, filed on Jul. 11, 2017.

(51) Int. Cl.
*B62D 55/116* (2006.01)
*B62D 55/06* (2006.01)
(Continued)

(52) U.S. Cl.
CPC ............ *B62D 55/116* (2013.01); *B62D 55/06* (2013.01); *B60G 2200/46* (2013.01);
(Continued)

(58) Field of Classification Search
CPC ....... B62D 55/16; B62D 55/06; B62D 55/084
See application file for complete search history.

(56) References Cited

U.S. PATENT DOCUMENTS 1,450,466 A 4/1923 Turnbull
1,785,124 A 12/1930 Jett
(Continued)

FOREIGN PATENT DOCUMENTS

DE 102014115112 B4 6/2019
EP 2181915 A1 5/2010
(Continued)

OTHER PUBLICATIONS

International Search Report from PCT/IB2018/055123, dated Dec. 20, 2018, Lee W Young.
(Continued)

*Primary Examiner* — Minnah L Seoh
*Assistant Examiner* — Abigail R Hymel
(74) *Attorney, Agent, or Firm* — BCF LLP

(57) ABSTRACT

A track system for use with a towed vehicle has an attachment assembly and a multi-member frame assembly. The multi-member frame assembly includes a primary frame member connected to the attachment assembly, at least one wheel-bearing frame member pivotably connected to the primary frame member about a pivot located within a recess, and at least one resilient bushing assembly located within
(Continued)

the recess and engaging the pivot. The at least one bushing assembly is resiliently deformable in a circumferential direction to permit pivoting of the pivot with respect to the recess, and is fixedly connected within the recess to resiliently bias the pivot towards a rest position with respect to the recess. The track system further includes leading and trailing idler wheel assemblies rotatably connected to the at least one wheel-bearing frame member, and an endless track.

17 Claims, 20 Drawing Sheets

(51) Int. Cl.
 B62D 55/084 (2006.01)
 B62D 63/06 (2006.01)
(52) U.S. Cl.
 CPC ...... *B60G 2204/17* (2013.01); *B60G 2204/41* (2013.01); *B60G 2204/4102* (2013.01); *B60G 2300/32* (2013.01); *B62D 55/084* (2013.01); *B62D 63/06* (2013.01)

(56) References Cited

U.S. PATENT DOCUMENTS

| | | | |
|---|---|---|---|
| 1,953,051 A | 3/1934 | Linn | |
| 1,953,053 A | 3/1934 | Linn | |
| 2,070,015 A | 2/1937 | Harry | |
| 2,082,920 A | 6/1937 | Tye | |
| 3,096,840 A * | 7/1963 | Mazzarins | B62D 55/125 |
| | | | 180/9.5 |
| 3,430,790 A | 3/1969 | Beltrami | |
| 3,790,230 A | 2/1974 | Jespersen | |
| 3,913,987 A | 10/1975 | Baldwin et al. | |
| 4,253,536 A | 3/1981 | Braathen | |
| 4,923,257 A | 5/1990 | Purcell | |
| 5,286,044 A | 2/1994 | Satzler et al. | |
| 5,409,305 A | 4/1995 | Nagorcka | |
| 5,899,542 A | 5/1999 | Lykken et al. | |
| 5,899,543 A | 5/1999 | Lykken et al. | |
| 5,954,148 A | 9/1999 | Okumura et al. | |
| 6,712,549 B2 | 3/2004 | Roth | |
| 7,077,216 B2 | 7/2006 | Juncker | |
| 7,533,741 B2 * | 5/2009 | Brazier | B62D 55/04 |
| | | | 180/9.5 |
| 7,644,788 B2 | 1/2010 | Scheetz | |
| 7,726,749 B2 | 6/2010 | Rosenboom | |
| 7,740,084 B2 | 6/2010 | Rosenboom | |
| 7,992,504 B2 | 8/2011 | Jensen | |
| 8,118,374 B2 | 2/2012 | Canossa | |
| 8,613,486 B2 | 12/2013 | Johannsen et al. | |
| 8,763,716 B2 | 7/2014 | Rosenboom | |
| 8,783,796 B2 | 7/2014 | Thorson | |
| 8,794,358 B2 | 8/2014 | Hansen | |
| 9,440,692 B2 | 9/2016 | Vik et al. | |
| 9,452,796 B2 | 9/2016 | Franck et al. | |
| 9,457,850 B2 | 10/2016 | Van Mill | |
| 9,457,854 B2 | 10/2016 | Van Mill et al. | |
| 9,663,164 B2 | 5/2017 | Vik et al. | |
| 9,682,736 B1 | 6/2017 | Prickel et al. | |
| 9,688,322 B1 | 6/2017 | Prickel et al. | |
| 9,828,047 B2 | 11/2017 | Eavenson et al. | |
| 10,131,387 B2 | 11/2018 | Erlinger | |
| 2001/0007234 A1 | 7/2001 | Scheetz | |
| 2003/0222432 A1 | 12/2003 | Bowers et al. | |
| 2012/0056473 A1 | 3/2012 | Hashimoto et al. | |
| 2012/0242142 A1 | 9/2012 | Kautsch et al. | |
| 2013/0045040 A1 * | 2/2013 | Ginn | F16F 1/393 |
| | | | 403/26 |
| 2013/0181431 A1 | 7/2013 | McMahon et al. | |
| 2015/0321708 A1 | 11/2015 | Van Mill et al. | |
| 2015/0367901 A1 | 12/2015 | Studer | |
| 2016/0068205 A1 | 3/2016 | Hellholm et al. | |
| 2016/0194038 A1 * | 7/2016 | Jean | B62D 55/084 |
| | | | 180/9.42 |
| 2016/0355221 A1 | 12/2016 | Van Mill et al. | |
| 2016/0368549 A1 * | 12/2016 | Davis | B60F 3/0015 |
| 2017/0057572 A1 | 3/2017 | Hakes et al. | |
| 2017/0210435 A1 | 7/2017 | Lykken | |
| 2017/0291651 A1 | 10/2017 | Prickel et al. | |
| 2018/0022407 A1 | 1/2018 | Lussier et al. | |
| 2018/0029652 A1 | 2/2018 | Loganathan et al. | |
| 2018/0154954 A1 | 6/2018 | Bagheri et al. | |

FOREIGN PATENT DOCUMENTS

| | | |
|---|---|---|
| EP | 2953844 B1 | 4/2017 |
| WO | 2004005118 A1 | 1/2004 |
| WO | 2006111693 A2 | 10/2006 |
| WO | 2015052310 A1 | 4/2015 |
| WO | 2017139356 A2 | 8/2017 |

OTHER PUBLICATIONS

English abstract of EP2181915.
English abstract of EP2953844.
English abstract of DE102014115112 retrieved from Espacenet on Dec. 14, 2020.
European Extended Search Report from EP 18831085; Juan Christensen; dated Mar. 4, 2021.

* cited by examiner

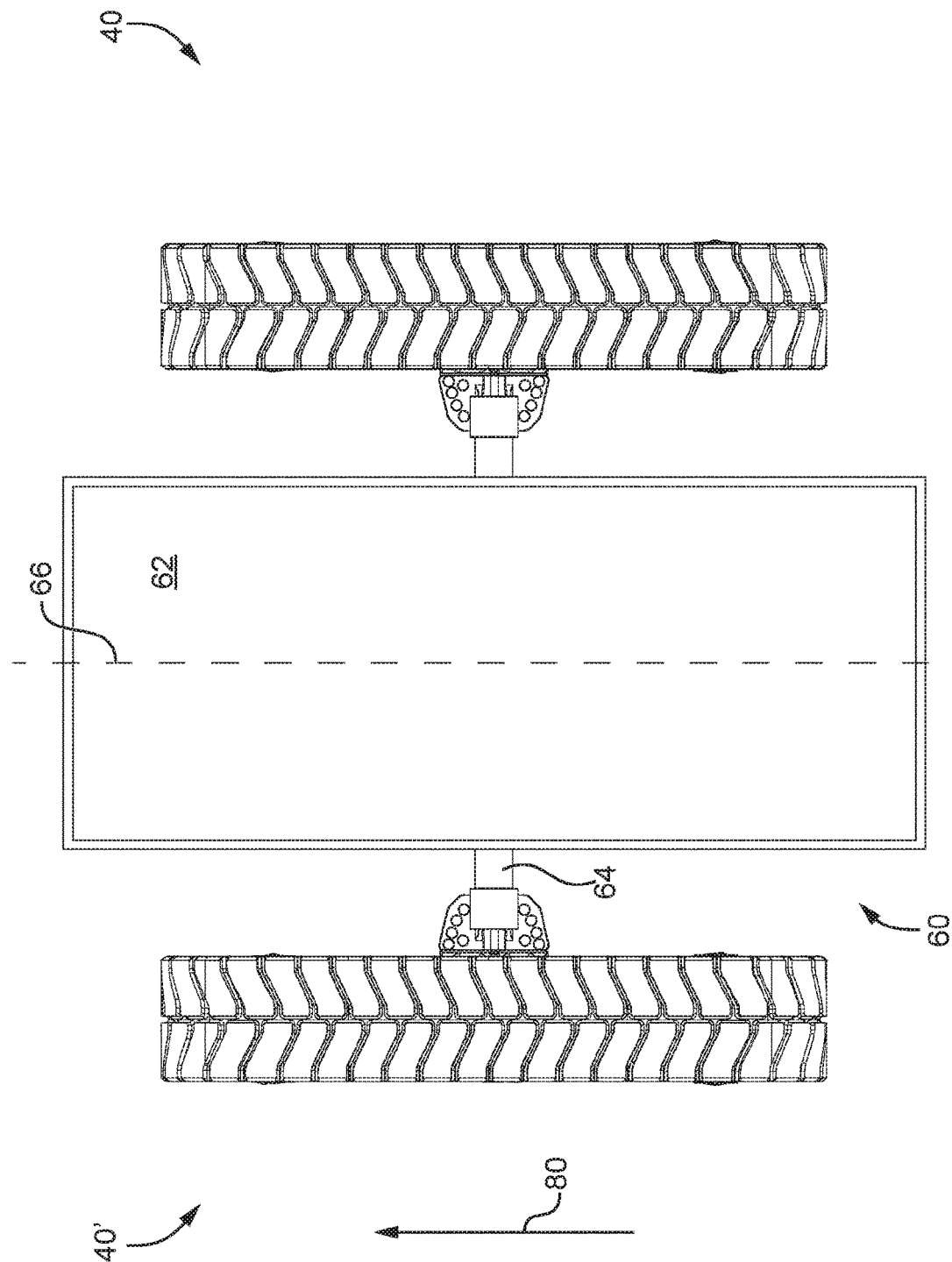

"TRACK ASSEMBLY FOR A TOWED VEHICLE"

CROSS-REFERENCE TO RELATED APPLICATION

The present application claims priority to U.S. Provisional Patent Application Ser. No. 62/530,937, filed Jul. 11, 2017, entitled "Track System for a Towed Vehicle", the content of which is incorporated herein by reference in its entirety.

TECHNICAL FIELD

The present technology relates to track systems.

BACKGROUND

Certain vehicles, such as, for example, agricultural vehicles (e.g., harvesters, combines, tractors, agriculture implement, etc.) and construction vehicles (e.g., bulldozers, front-end loaders, etc.), are used to perform work on ground surfaces that are soft, slippery and/or uneven (e.g., soil, mud, sand, ice, snow, etc.).

Conventionally, such vehicles have had large wheels with tires on them to move the vehicle along the ground surface. Under some conditions, such tires may have poor traction on some ground surfaces and, as these vehicles are generally heavy, the tires may compact the ground surface in an undesirable way owing to the weight of the vehicle. As an example, when the vehicle is an agricultural vehicle, the tires may compact the soil in such a way as to undesirably inhibit the growth of crops. In order to reduce the aforementioned drawbacks, to increase traction and to distribute the weight of the vehicle over a larger area on the ground surface, track systems were developed to be used in place of at least some of the wheels and tires on the vehicles.

Additionally, such tracked vehicles are sometimes used to tow vehicles having work implements thereon, and such towed vehicles may also benefit from having track systems in place of wheels. Track systems designed for towed vehicles have a frame connected to the towed vehicle's chassis, leading and trailing idler wheels rotatably connected at each end of the frame, and support wheels rotatably connected to the frame intermediate the idler wheels. Track systems for towed vehicles differ from other track systems designed for self-propelled vehicles in that they do not include a sprocket wheel and a gearbox that receives a drive shaft of the vehicle.

Known track systems for towed vehicles, such as the track system described in U.S. Pat. No. 8,763,716 B2, include structures for permitting the support wheels of the track system to pivot about a roll axis, i.e. an axis that extends longitudinally with respect to the track system, to conform to the contours of the ground surface on which the towed vehicle travels. According to its abstract, U.S. Pat. No. 8,763,716 B2 describes a technology wherein: "A vehicle wheel assembly is provided which includes a vehicle frame having a first axle, a wheel assembly having a housing with an aperture engaging the first axle and enabling the wheel assembly to pivot in a first plane about a first axis formed by the first axle. A cylindrical member is carried by the housing of the wheel assembly, the cylindrical member and housing are arranged perpendicular to the first axle. A first wheel is pivotably connected to a first portion of the cylindrical member and a second wheel is pivotably connected to a second portion of the cylindrical member. The first wheel and second wheel independently pivot in a second plane about a second axis formed by the cylindrical member. The first axis is arranged perpendicular to the second axis and the first plane is arranged perpendicular to the second plane."

Thus, while the technology described in the U.S. Pat. No. 8,763,716 B2 may indeed ameliorate some of the drawbacks of conventional track systems, continued improvements in this area remain desirable.

SUMMARY

It is therefore an object of the present technology to ameliorate the situation with respect to at least one of the inconveniences present in the prior art.

It is also an object of the present invention to provide an improved track system for a towed vehicle at least in some instances as compared with some of the prior art. For instance, the structure described in U.S. Pat. No. 8,763,716 B2 does not allow for the idler wheels, i.e. the fore and aft wheel assemblies that guide the endless track around the track system, to pivot about the roll axis to conform to the ground surface. This can become an issue when the towed vehicle travels, for example, on a road having a crown since a portion of the endless track may not conform to the surface of the road when it passes under the fore and aft idler wheels. This can lead to premature wear of portions of the endless track or even to track blowout due to the increased pressure applied to at least some portion of the endless track when the track system travels on a road having a crown.

According to an aspect of the present technology, there is provided a track system for use with a towed vehicle having a chassis and an axle extending laterally outwardly from the chassis suitable for connection to the track system. The track system includes an attachment assembly rotatably connectable to the axle of the vehicle and a multi-member frame assembly disposed laterally outwardly from the attachment assembly. The multi-member frame assembly includes a primary frame member connected to the attachment assembly, at least one wheel-bearing frame member pivotably connected to the primary frame member about a pivot located within a recess, and at least one resilient bushing assembly located within the recess and engaging the pivot. The at least one bushing assembly is resiliently deformable in a circumferential direction to permit pivoting of the pivot with respect to the recess. The at least one resilient bushing assembly is fixedly connected within the recess to resiliently bias the pivot towards a rest position with respect to the recess. The track system further includes a leading idler wheel assembly rotatably connected to the at least one wheel-bearing frame member. The leading idler wheel assembly pivots with respect to the primary frame member with the at least one wheel-bearing frame member. The track system further includes a trailing idler wheel assembly rotatably connected to the at least one wheel-bearing frame member. The trailing idler wheel assembly pivots with respect to the primary frame member with the at least one wheel-bearing frame member. The track system further includes an endless track extending around the primary frame member, the at least one wheel-bearing frame member, and the leading and trailing idler wheel assemblies.

By having the leading and trailing idler wheel assemblies pivotable with respect to the primary frame member with the at least one wheel-bearing frame member, the track system can conform to a changing terrain advantageously compared to other track system where only the support wheels are pivotable about a longitudinal axis of the track system. In addition, having the leading and trailing idler wheel assemblies pivotable with respect to the primary frame member with the at least one wheel-bearing frame member may reduce wear of the endless track when the track system travels on a transversally inclined ground surface, such as a crowned road.

In some embodiments, the at least one wheel-bearing frame member is movable with respect the primary frame member via resilient deformation of the at least one bushing assembly in a radial direction.

In some embodiments, the track system further includes a plate having a vertically extending slotted hole. The plate is connected to the primary frame member. The pivot extends through the slotted hole of the plate, and the at least one wheel-bearing frame member is vertically movable with respect to the primary frame member via the resilient deformation of the at least one bushing assembly in the radial direction.

In some embodiments, the at least one wheel-bearing frame member is pivotable with respect to the primary frame member by an angle ranging between about −10 to +10 degrees with respect to the rest position.

In some embodiments, the track system further includes at least one support wheel assembly rotatably connected to the at least one wheel-bearing frame member. The at least one support wheel assembly is disposed intermediate the leading and trailing idler wheel assemblies. The at least one support wheel assembly pivots with respect to the primary frame member with the at least one wheel-bearing frame member.

In some embodiments, the primary frame member defines the recess. The recess extends along a longitudinal axis of the track system.

In some embodiments, the at least one bushing assembly defines a bushing axis. The bushing axis is coaxial with the longitudinal axis.

In some embodiments, the recess is a leading recess. The pivot is a leading pivot defined by a leading pin assembly. The at least one resilient bushing assembly is a leading resilient bushing assembly. The leading resilient bushing assembly is located within the leading recess. The leading pin assembly has a first portion engaging an inner surface of the leading bushing assembly and a second portion extending outside of the leading recess. The at least one wheel-bearing frame member is at least indirectly connected to the second portion of the leading pin assembly. The track system further includes a trailing recess defined by the primary frame member, a trailing pin assembly defining a trailing pivot, the at least one wheel-bearing frame member pivotably connected to the primary frame member about the trailing pivot located within the trailing recess, and a trailing resilient bushing assembly located within the trailing recess and engaging the trailing pivot. The at least one trailing resilient bushing assembly is resiliently deformable in a circumferential direction to permit pivoting of the trailing pivot with respect to the trailing recess. The trailing resilient bushing assembly is fixedly connected within the trailing recess to resiliently bias the trailing pivot towards a rest position with respect to the trailing recess. The trailing pin assembly has a first portion engaging an inner surface of the trailing resilient bushing assembly and a second portion extending outside of the trailing recess, and the at least one wheel-bearing frame member is at least indirectly connected to the second portion of the trailing pin assembly.

In some embodiments, the at least one wheel-bearing frame member includes a leading wheel-bearing frame member and a trailing wheel-bearing frame member. The leading wheel-bearing frame member is at least indirectly connected to the second portion of the leading pin assembly, and the trailing wheel-bearing frame member is at least indirectly connected to the second portion of the trailing pin assembly.

In some embodiments, the leading and trailing wheel-bearing frame members are independently pivotable with respect to the primary frame member.

In some embodiments, the leading and trailing wheel-bearing frame members are independently vertically movable with respect to the primary frame member.

In some embodiments, the leading pin assembly is slidably engaged to the inner surface of the leading bushing assembly, and the trailing pin assembly is slidably engaged to the inner surface of the trailing bushing assembly.

In some embodiments, the track system further includes a threaded rod operatively connected to the first portions of the leading and trailing pin assemblies, and the leading and trailing wheel-bearing frame members are pivotable together with respect to the primary frame member.

In some embodiments, the multi-member frame assembly further includes a leading secondary frame member and a trailing secondary frame member. The leading secondary frame member is connected between the leading pin assembly and the leading wheel-bearing frame member. The trailing secondary frame member is connected between the trailing pin assembly and the trailing wheel-bearing frame member.

In some embodiments, the leading wheel-bearing frame member is pivotably connected to the leading secondary frame member, and the trailing wheel-bearing frame member is pivotably connected to the trailing secondary frame member.

In some embodiments, the track system further includes a damper assembly pivotably connected between the leading secondary frame member and the trailing secondary frame member.

In some embodiments, the at least one bushing assembly includes an inner jacket, an outer jacket and a resilient bushing disposed between the inner and outer jackets.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Should there be any difference in the definitions of term in this application and the definition of these terms in any document included herein by reference, the terms as defined in the present application take precedence.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 1B is a top plan view of a towed vehicle having the track system of FIG. 1A operatively connected to the right side thereof, and another track system being a mirror image of the track system of FIG. 1A operatively connected to the left side thereof;

DETAILED DESCRIPTION

With reference to FIGS. 1A to 8, a first embodiment of the present technology, track system 40, will be described. It is to be expressly understood that the track system 40 is merely an embodiment of the present technology. Thus, the description thereof that follows is intended to be only a description of illustrative examples of the present technology. This description is not intended to define the scope or set forth the bounds of the present technology. In some cases, what are believed to be helpful examples of modifications or alternatives to track system 40 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing or embodying that element of the present technology. As a person skilled in the art would understand, this is likely not the case. In addition, it is to be understood that the track system 40 may provide in certain aspects a simple embodiment of the present technology, and that where such is the case it has been presented in this manner as an aid to understanding. As persons skilled in the art would understand, various embodiments of the present technology may be of a greater complexity than what is described herein.

The track system 40 is for use with a towed vehicle 60 (schematically shown in FIGS. 1B to 1D) having a chassis 62 and an axle 64 extending laterally outwardly from the chassis 62 for connection to the track system 40. The chassis 62 supports the various components of the towed vehicle 60. In some embodiments, the towed vehicle 60 is an agricultural vehicle and supports agricultural implements such as planters, sprayers or similar devices. However, the track system 40 could be used on many different types of towed vehicles that serve many different functions.

Figure 1A:
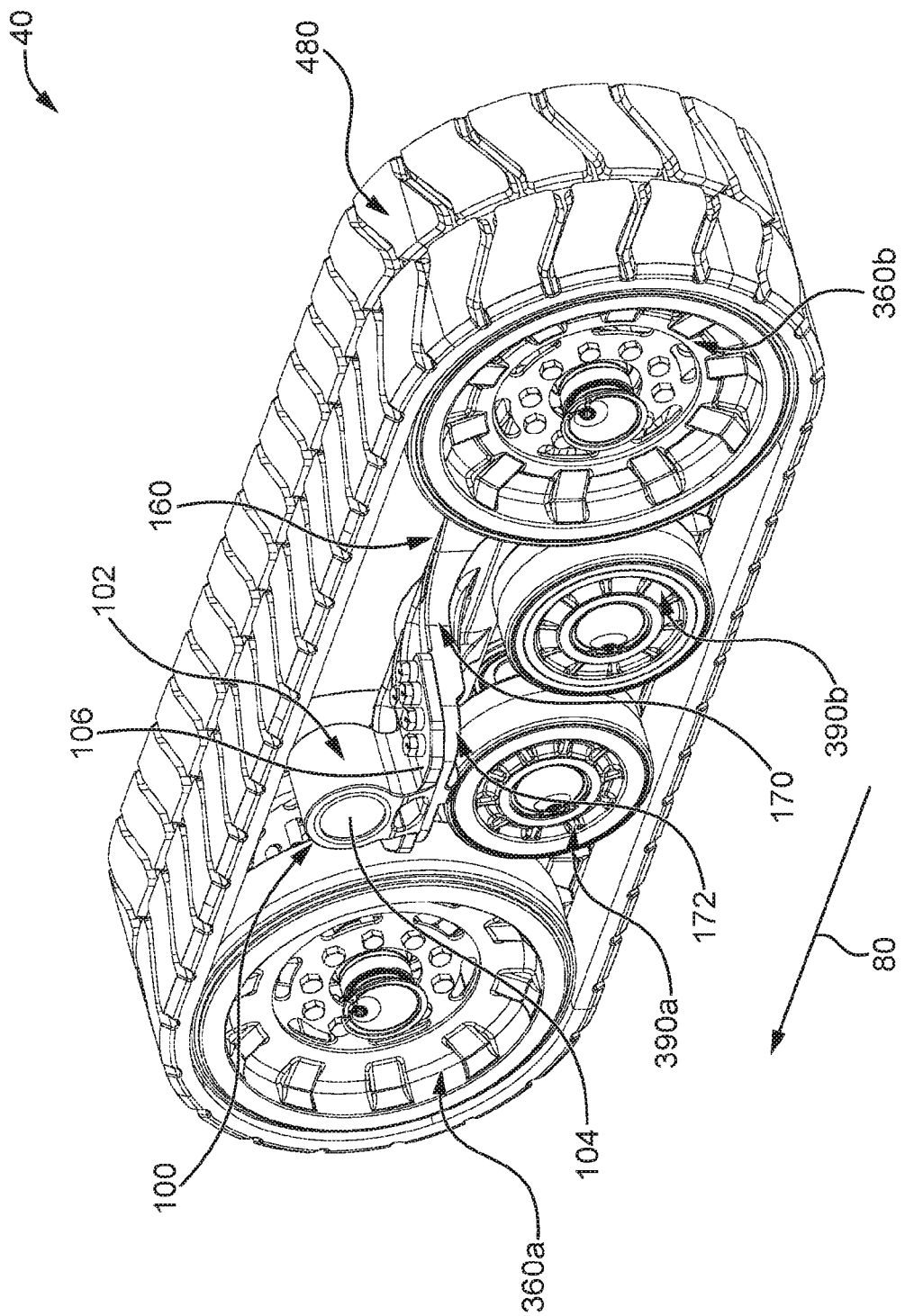
FIG. 1A is a perspective view taken from a rear, top, left side of a track system in accordance with a first embodiment of the present technology, the track system being configured to be operatively connected to a right side of a towed vehicle.

In the context of the following description, "outwardly" or "outward" means away from a longitudinal centerline 66 of the chassis 62 of the towed vehicle 60, and "inwardly" or "inward" means toward the longitudinal centerline 66. In addition, in the context of the following description, "longitudinally" means in a direction parallel to the longitudinal centerline 66 of the chassis 62 of the towed vehicle 60 in a plane parallel to flat level ground, "transversally" means in a direction perpendicular to the longitudinal centerline 66 in a plane parallel to flat level ground, and "vertically" means in a direction perpendicular to the longitudinal centerline 66 along a height direction of the track system 40 in a plane perpendicular to flat level ground. Note that in the Figures, a "+" symbol is used to indicate an axis of rotation. In the context of the present technology, the term "axis" may be used to indicate an axis of rotation, or the term may refer to a "pivot joint" that includes all the necessary structure (bearing structures, pins, axles and other components) to permit a structure to pivot about such axis, as the case may be. Moreover, the direction of forward travel of the track system 40 is indicated by an arrow 80 (FIGS. 1A and 1B). In the present description, the "leading" components are identified with an "a" added to their reference numeral (i.e. components towards the front of the vehicle defined consistently with the vehicle's forward direction of travel), and the "trailing" components are identified with a "b" added to their reference numeral (i.e. components towards the rear of the vehicle defined consistently with the vehicle's forward direction of travel). In the following description and accompanying FIGS. 1A and 2 to 17, the track system 40 is configured to be attached to a right side of the chassis 62 of the vehicle 60. A track system 40' (FIGS. 1B to 1D), being another embodiment of the present technology and configured to be connected to a left side of the chassis 62 of the vehicle 60, is a mirror image of the track system 40 with the necessary adaptations, and the components of the track system 40' are identified with a "'" added to their reference numeral. That embodiment will not be further described herein.

Referring to FIGS. 1A to 3, the track system 40 will be generally described. The track system 40 has an attachment assembly 100 connectable to the axle 64 of the vehicle 60 and a multi-member frame assembly 160 disposed laterally outwardly of the attachment assembly 100. Leading and trailing idler wheel assemblies 360a, 360b, also known in the art as guide wheels, are rotatably connected to the multi-member frame assembly 160 through leading and trailing idler axle assemblies 362a, 362b. Leading and trailing support wheel assemblies 390a, 390b, also known in the art as road wheels or roller wheels, are disposed intermediate the leading idler wheel assembly 360a and the trailing idler wheel assembly 360b, and are rotatably connected to the multi-member frame assembly 160 through leading and trailing support wheel axle assemblies 392a, 392b. The track system 40 further includes a tensioner 330 operatively connected to the multi-member frame assembly 160, and an endless track 480 extending around the multi-member frame assembly 160, the leading idler wheel assembly 360a, the trailing idler wheel assembly 360b, and the support wheel assemblies 390a, 390b.

The endless track 480 is an endless polymeric track. The endless track 480 has an inner surface 482 engaging the leading idler wheel assembly 360a, the trailing idler wheel assembly 360b, and the leading and trailing support wheel assemblies 390a, 390b. Lugs 484 are disposed on a central portion of the inner surface 482. The leading and trailing idler and support wheel assemblies 360a, 360b, 390a, 390b have laterally spaced-apart wheels engaging the inner surface 482 of the endless track 480 on either side of the lugs 484. The endless track 480 also has an outer surface 486 with a tread 488 selected for ground engagement. The tread 488 varies in different embodiments according to the type of vehicle on which the track system 40 is to be used with and/or the type of ground surface on which the vehicle is destined to be towed. It is contemplated that within the scope of the present technology, the endless track 480 may be constructed of a wide variety of materials and structures including metallic components known in track systems. The specific properties and materials of the endless track 480 are not central to the present technology and will not be described in detail.

Figure 1C:
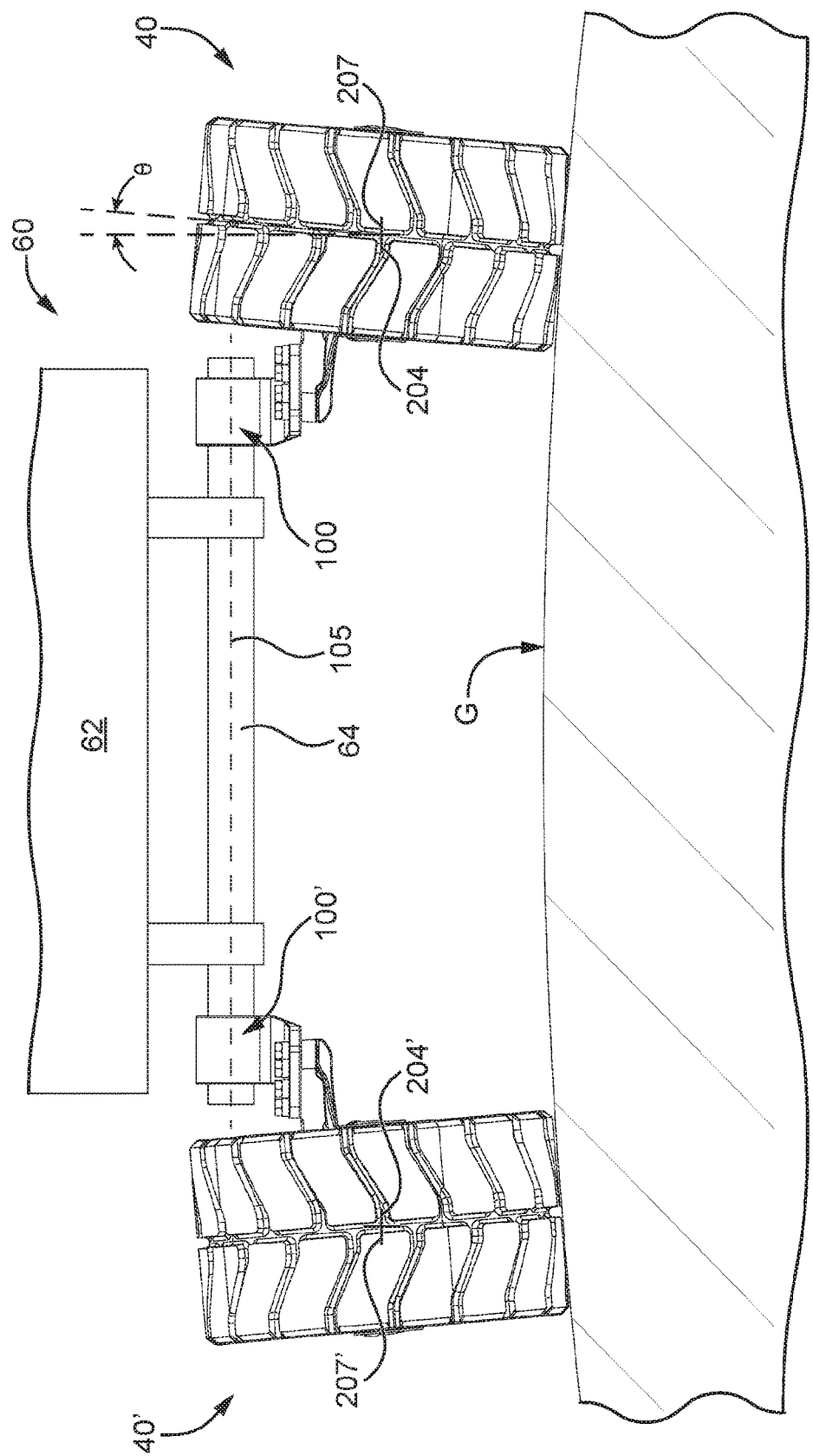
FIG. 1C is a rear elevation view of the vehicle of FIG. 1B on a crowned ground surface, with the track systems pivoted about the bushing axis thereof.
Figure 1D:
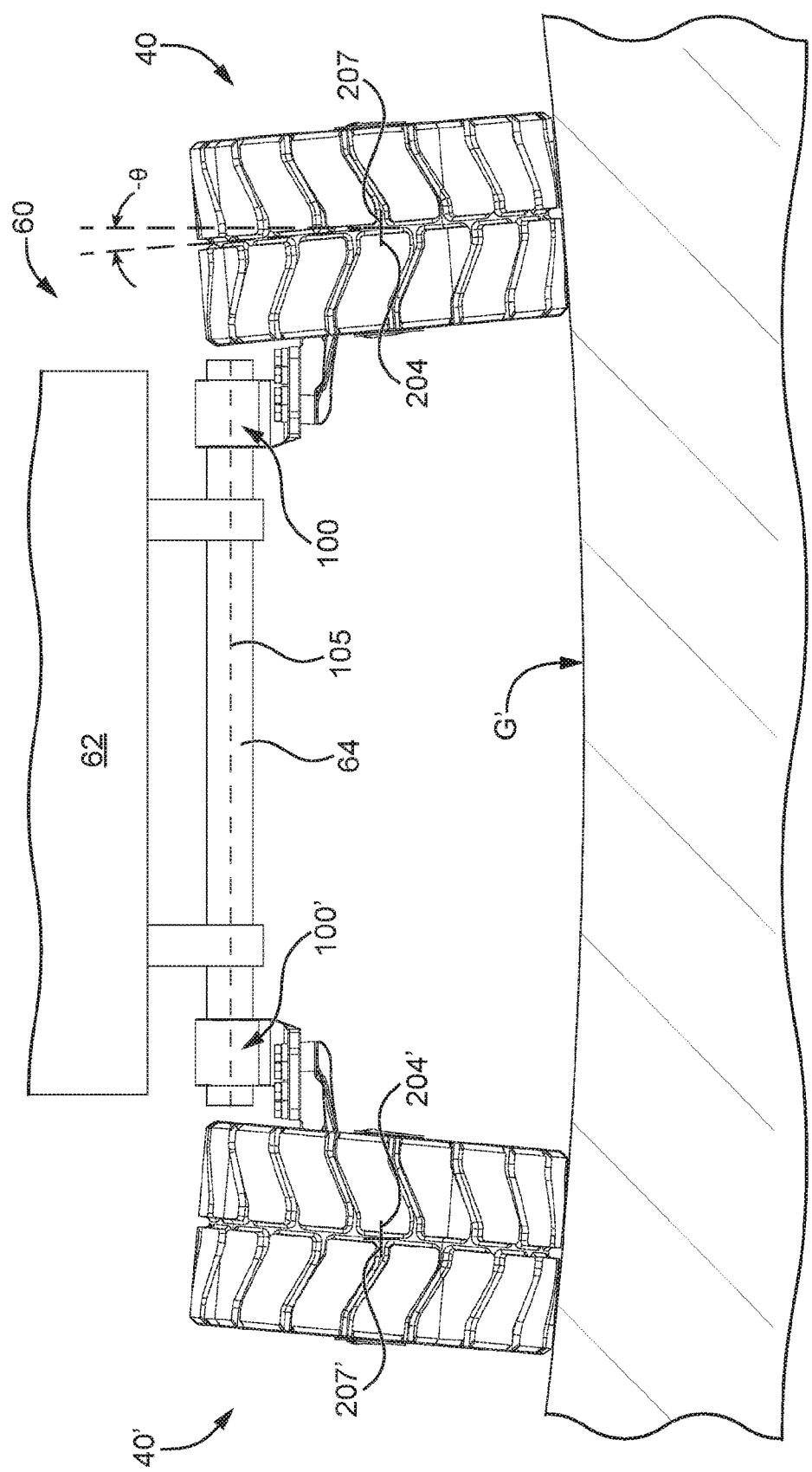
FIG. 1D is a rear elevation view of the vehicle of FIG. 1B on a ground surface forming a shallow ditch, with the track systems pivoted about the bushing axis thereof.
Figure 2:
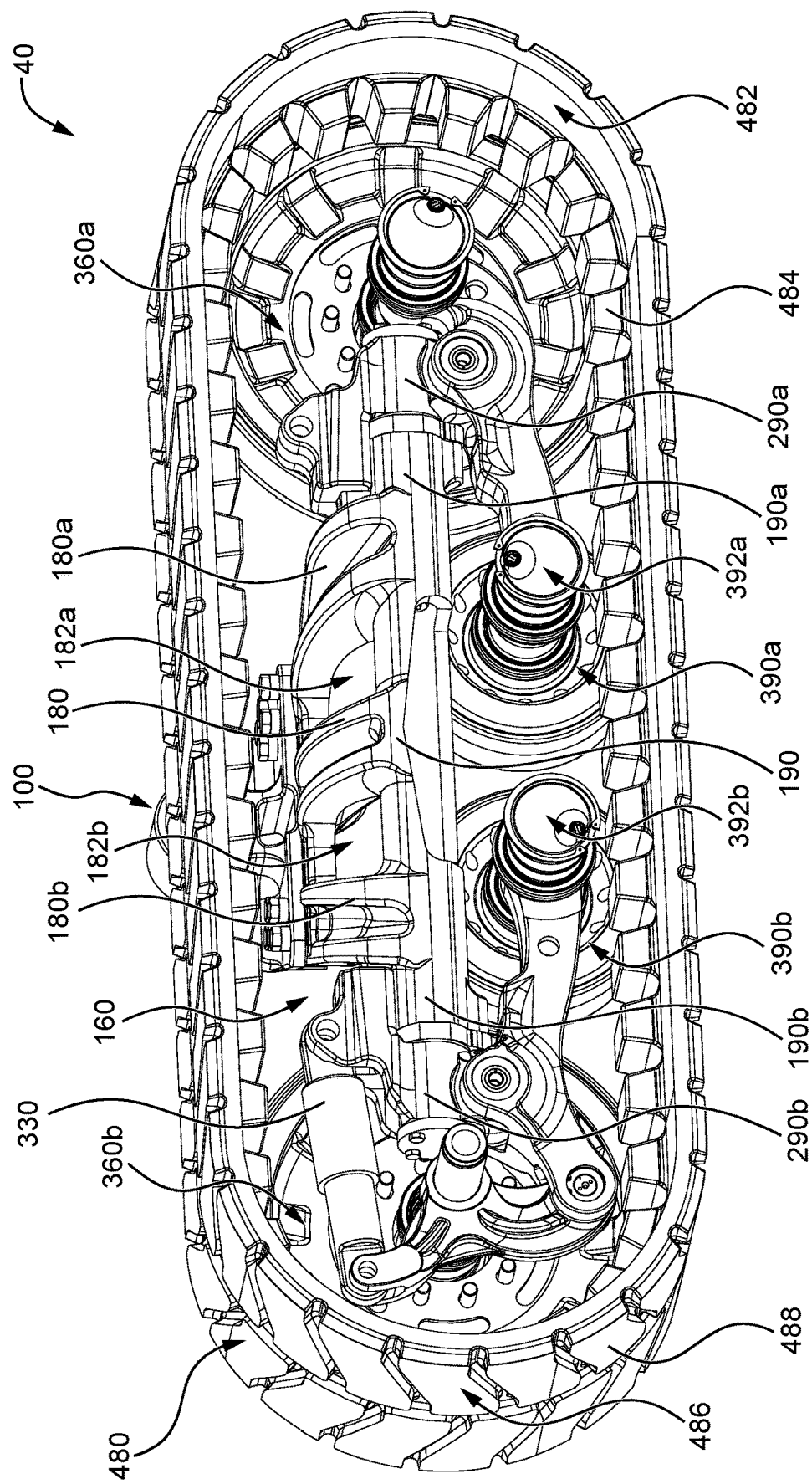
FIG. 2 is a perspective view taken from a rear, top, right side of the track system of FIG. 1, with the right leading and trailing idler and support wheels removed.

Referring to FIGS. 1A and 3 to 5, the attachment assembly 100 will be described in more details. The attachment assembly 100 includes a pillow block bearing assembly 102. The pillow block bearing assembly 102 has a bearing 104 having an axis 105, and a base 106 extending below the bearing 104. When the track system 40 is connected to the vehicle 60, the axle 64 is coaxial with the axis 105, as best seen in FIGS. 1C and 1D, and is operatively connected to the bearing 104. Thus, the axle extends parallel to a plane 108 (FIG. 5) defined by the base 106. The track system 40 is rotatable about the axis 105 with respect to the chassis 62 of the vehicle 60 since the axle 64 is received within the bearing 104. As such, when the vehicle 60 is towed on a slopped terrain, the track system 40 can pitch positively or negatively about the axis 105 to conform to the contour of the terrain.

Figure 5:
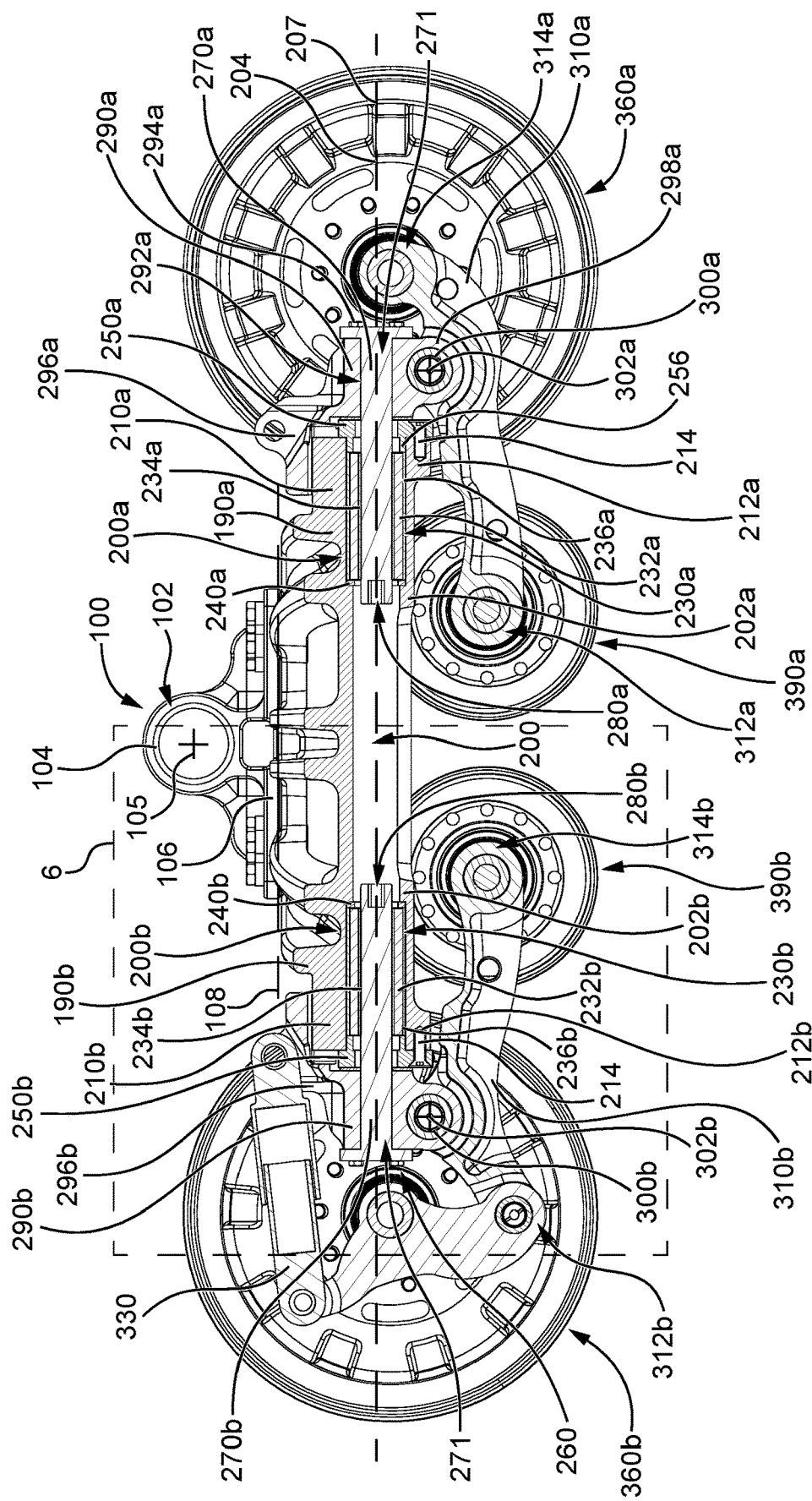
FIG. 5 is a cross-sectional view taken along cross-section line 5-5 of FIG. 4.
Figure 6:
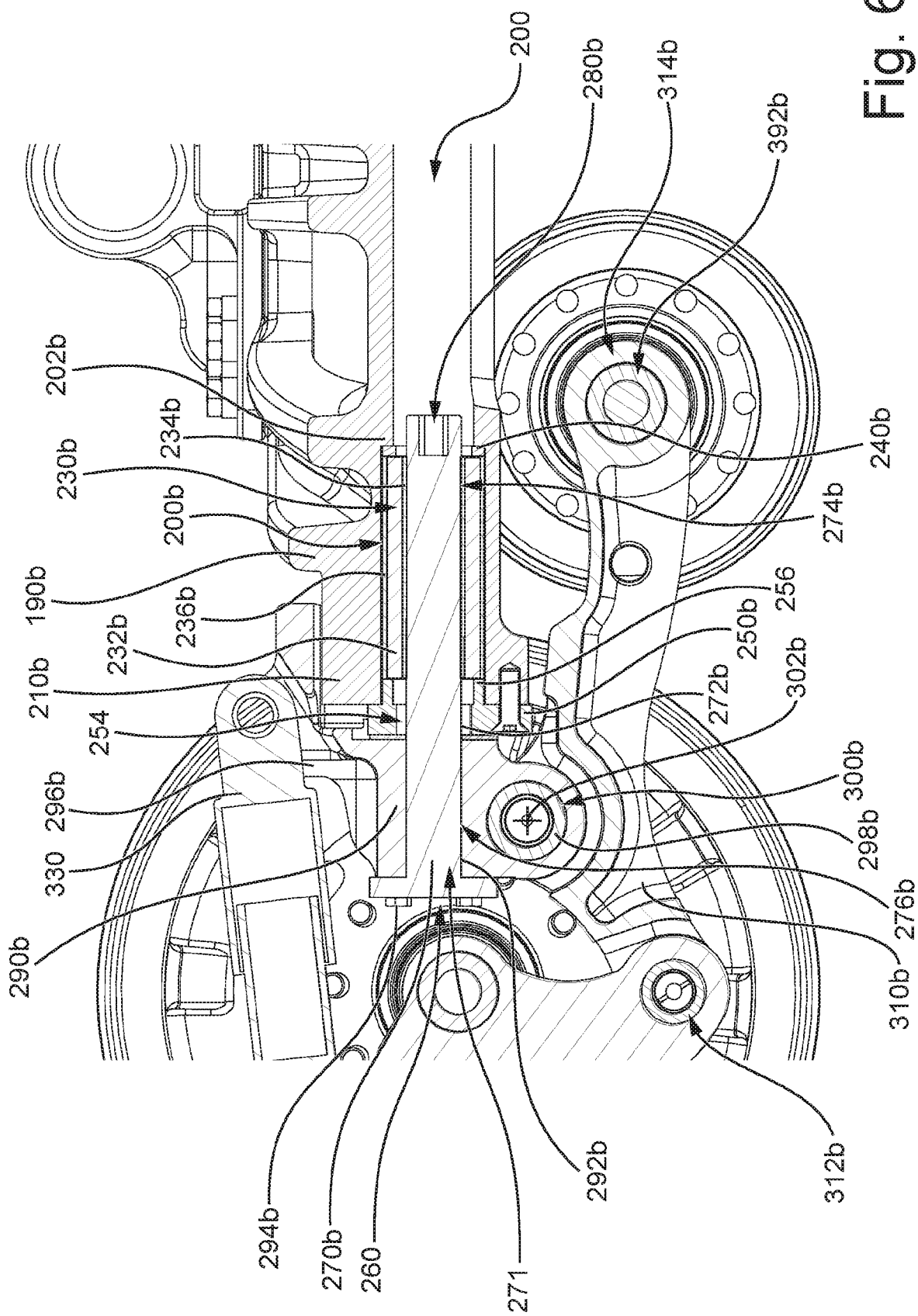
FIG. 6 is an enlarged view of portion 6 of the cross-section of FIG. 5.
Figure 7:
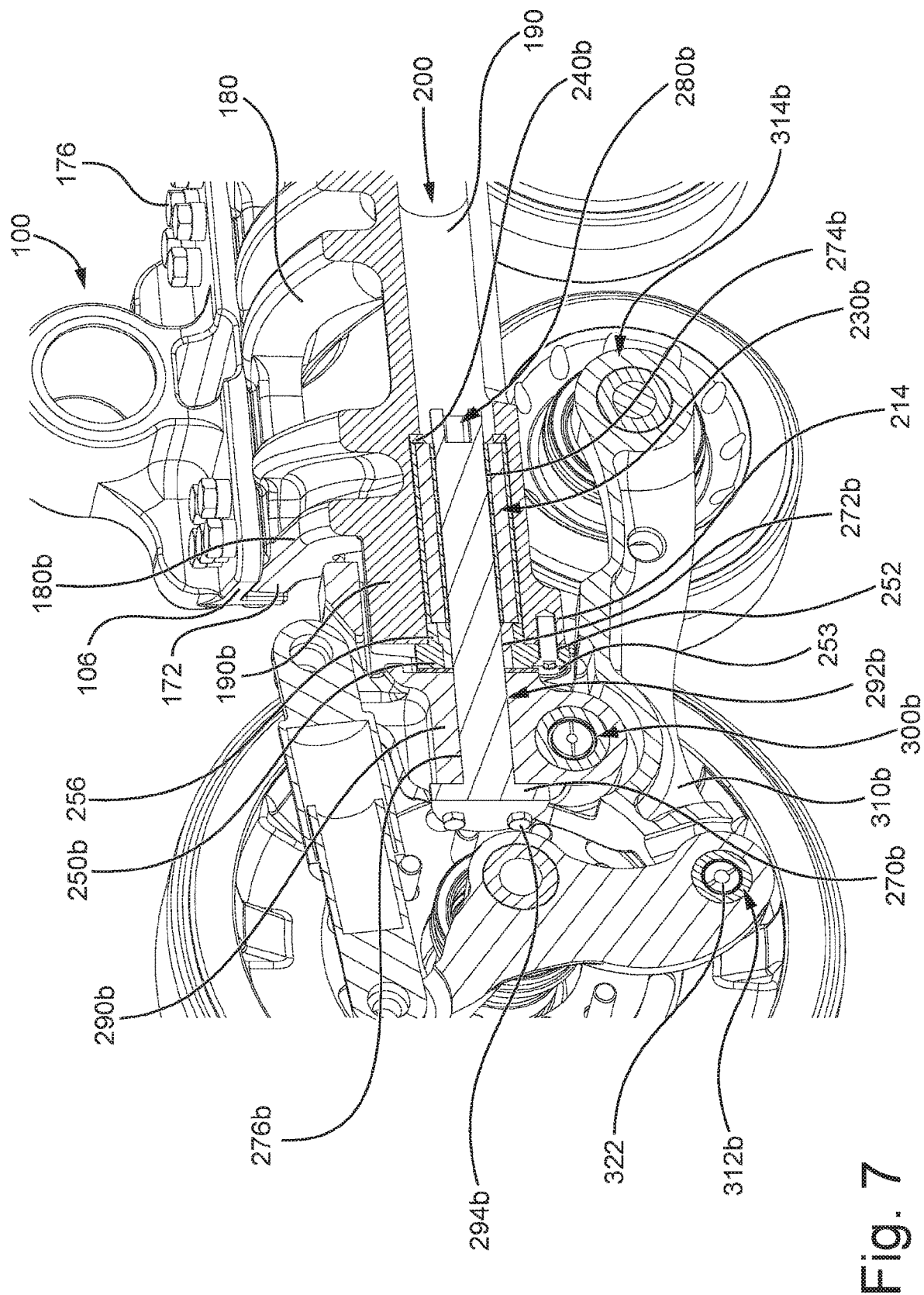
FIG. 7 is a perspective view of the portion 6 of the cross-section of FIG. 5.

Referring to FIGS. 1A to 8, the track system 40 further includes the multi-member frame assembly 160 disposed laterally outwardly of the attachment assembly 100. The multi-member frame assembly 160 supports the leading and trailing idler wheel assemblies 360a, 360b, and the leading and trailing support wheels 390a, 390b as will be described below. The multi-member frame assembly 160 includes a primary frame member 170 (FIG. 3) connected to the attachment assembly 100. The primary frame member 170 has an attachment portion 172 (FIG. 1A), leading, intermediate and trailing arms 180a, 180, 180b connected to the attachment portion 172, and leading, intermediate and trailing portions 190a, 190, 190b that are connected to the arms 180a, 180, 180b. The primary frame member 170 shown in the present embodiment is unitary since the attachment portion 172, the arms 180a, 180, 180b and the portions 190a, 190, 190b are integrally formed, but in some embodiments, it is contemplated that the primary frame member 170 could be assembled from separate components connected together. In some embodiments, it is contemplated that the attachment assembly 100 could be integrally formed with the primary frame member 170. The attachment portion 172 is shaped and dimensioned to match the base 106 of the pillow block bearing assembly 102 (FIG. 7). A bolt pattern is defined in both the base 106 and the attachment portion 172. Fasteners 176 connect the base 106 to the attachment portion 172.

The attachment assembly 100 could differ from the one shown in the Figures. It is contemplated that the bolt patterns defined in both the base 106 and the attachment portion 172 could include slotted holes so that the base 106 and the attachment portion 172 be angularly displaced with respect to one another about a vertically extending axis to select a toe-in or toe-out angle of the track system 40 and/or to select a tracking adjustment with respect to the forward direction of travel of the vehicle 60. In other embodiments, the axle 64 is replaced by left and right axles (not shown) pivotally connected to the chassis 62 of the vehicle 60 about vertically extending axes (not shown). The pivoting of the left and right axles about the vertically extending axes would also permit the selection of a toe-in or toe-out angle for the track systems 40, 40' and/or to select a tracking adjustment with respect to the forward direction of travel of the vehicle 60. In yet other embodiments, it is contemplated that the attachment assembly 100 could be connected to a bottom face of the attachment portion 172. In such an embodiment, the axis 105 would extend below the plane 108 (FIG. 5). Other structures provided on the primary frame member 170 for selecting a toe-in or toe-out angle for the track systems 40, 40' and/or to select a tracking adjustment with respect to the forward direction of travel of the vehicle 60 are contemplated.

Still referring to FIGS. 1A to 8, the leading, intermediate and trailing arms 180a, 180, 180b extend laterally outwardly from the attachment portion 172. Leading and trailing cavities 182a, 182b (FIGS. 2 and 4) are formed between the leading, intermediate and trailing arms 180a, 180, 180b. In some embodiments, the leading, intermediate and trailing arms 180a, 180, 180b are replaced by a single arm and the cavities 182a, 182b are absent. The leading, intermediate and trailing arms 180a, 180, 180b each have a depression 184a, 184, 184b defined therein. The cavities 182a, 182b between the arms 180a, 180, 180b and the depressions 184a, 184, 184b may assist in reducing the overall weight of the primary frame member 170 while substantially maintaining the structural properties of the primary frame member 170. These features may also assist the track system 40 to be efficiently mechanically packaged and/or reducing the volume of the track system 40, in embodiments where such is judged to be important.

Figure 8:
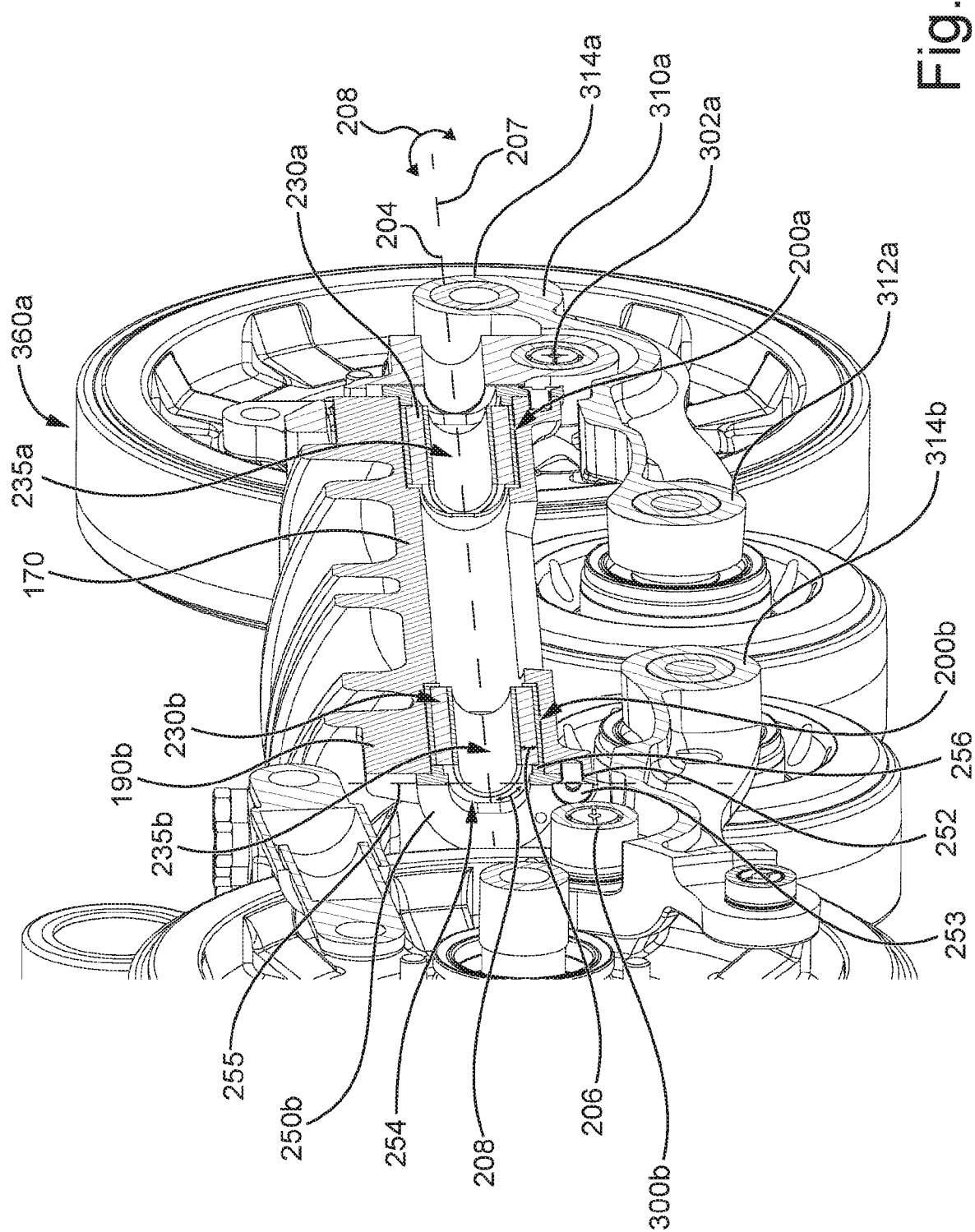
FIG. 8 is a perspective view of the portion 6 of the cross-section of FIG. 5, with the trailing frame member and the leading and trailing pin assemblies removed.
Figure 9:
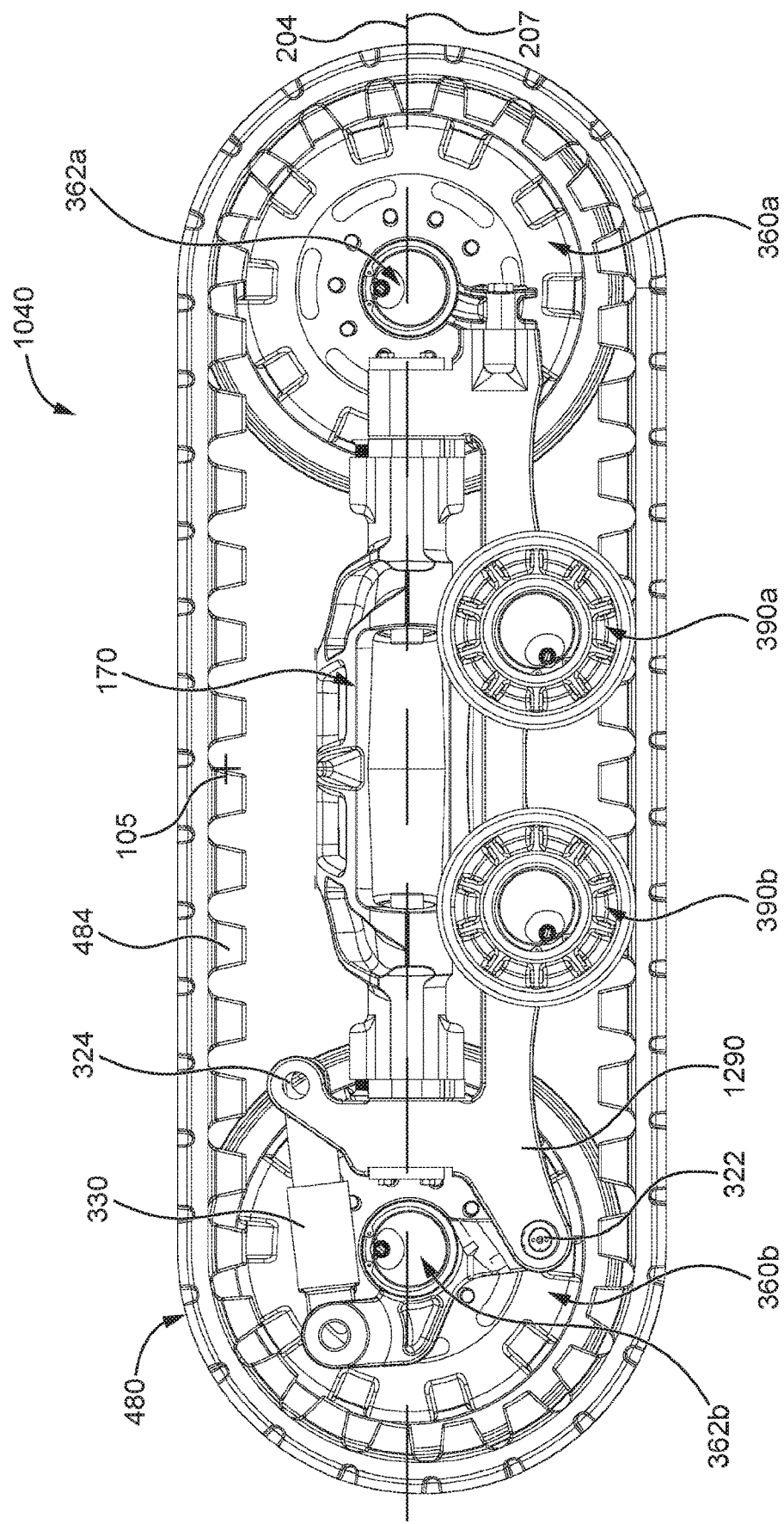
FIG. 9 is a right side elevation view of a track system in accordance with a second embodiment of the present technology and being configured to be operatively connected to a right side of a towed vehicle, with the attachment assembly removed, and the right leading and trailing idler wheels removed.
Figure 10:
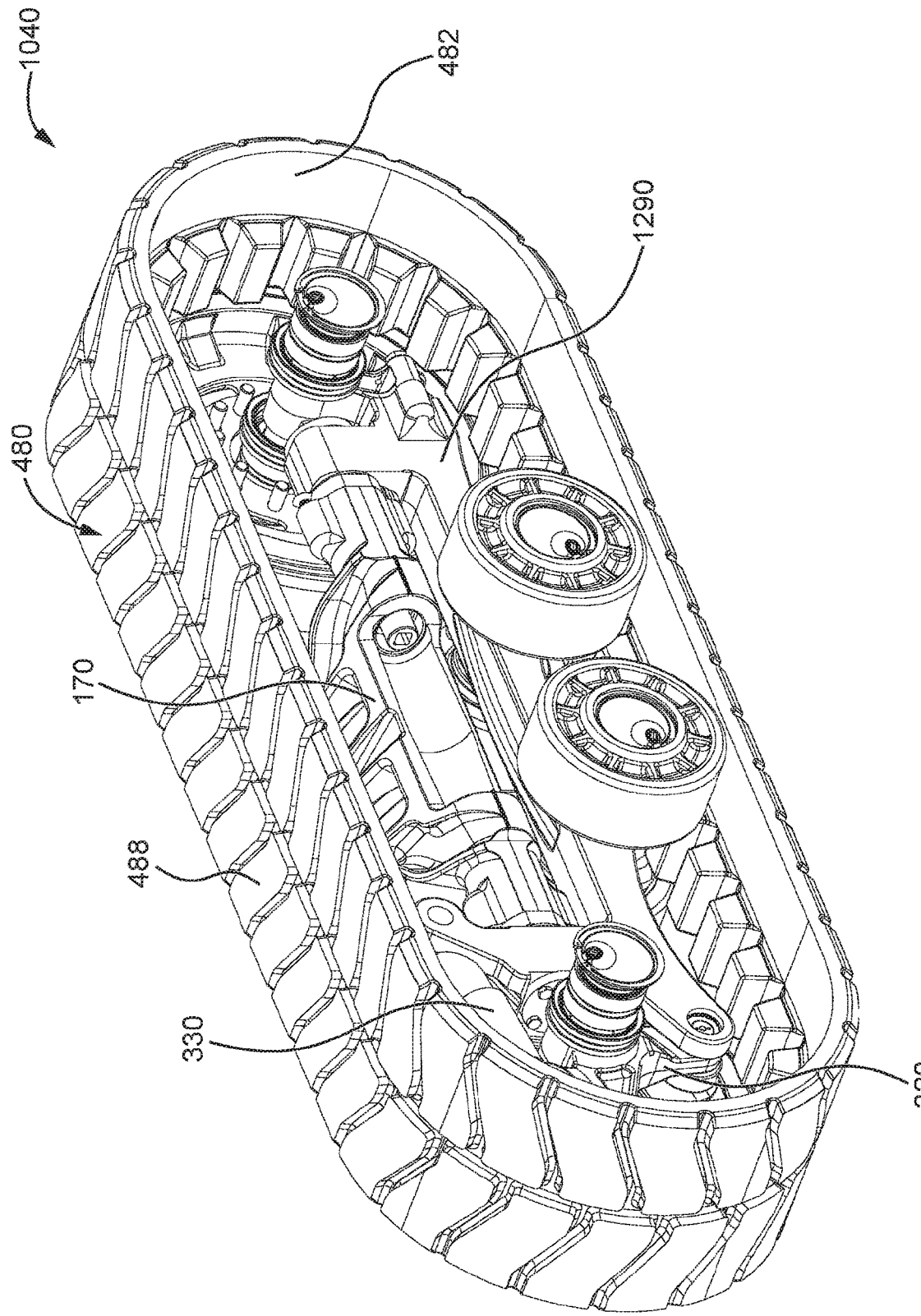
FIG. 10 is a perspective view taken from a rear, top, right side of the track system of FIG. 9.
Figure 11:
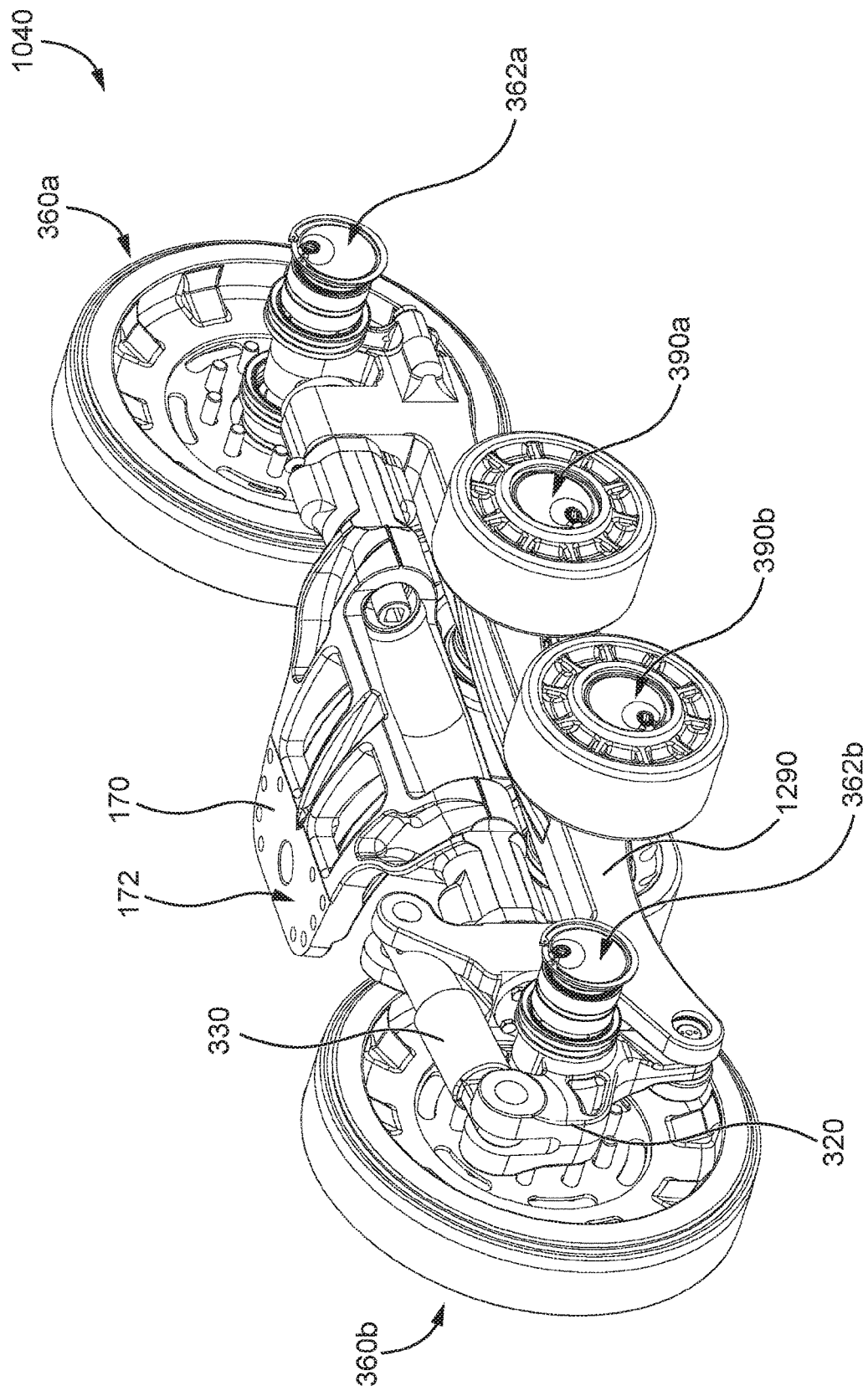
FIG. 11 a perspective view taken from a rear, top, right side of the track system of FIG. 9, with the endless track removed.
Figure 12:
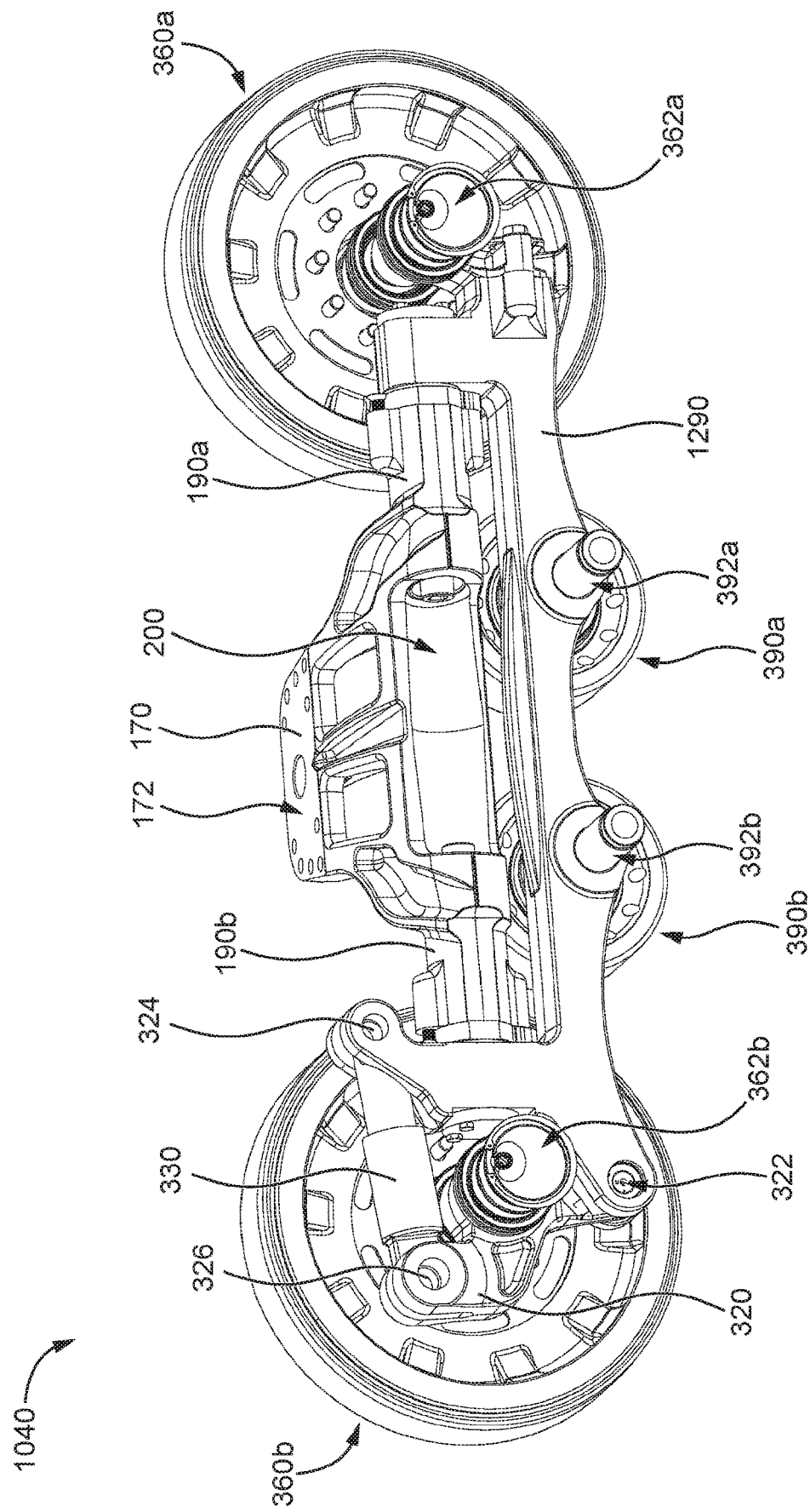
FIG. 12 a perspective view taken from a rear, top, right side of the track system of FIG. 11, with the right leading and trailing support wheels removed.

The primary frame member 170 further has leading and trailing portions 190a, 190b that extend longitudinally. The leading portion 190a has a recess 200a defined therein, and the trailing portion 190b has a recess 200b defined therein (FIGS. 5 and 8). The recesses 200a, 200b extend longitudinally and are cylindrically shaped, but the recesses 200a, 200b could be shaped otherwise in other embodiments. The recesses 200a, 200b extend about a longitudinal axis 204 (FIGS. 4 and 5) extending in the center of the recesses 200a, 200b. The longitudinal axis 204 is parallel to the longitudinal centerline 66 of the vehicle 60. A central recess 200 is defined between the leading and trailing portions 190a, 190b of the primary frame member 170. In some embodiments, the central recess 200 could be omitted. The central recess 200 is coaxial with the leading and trailing recesses 200a, 200b about the longitudinal axis 204. The trailing portion 190b has a shoulder 202b (FIG. 6) located at the leading end of the recess 200b that is next to the central recess 200. Similarly, the leading portion 190a has a shoulder 202a (FIG. 5) located at the trailing end of the recess 200a that is next to the central recess 200. The leading and trailing portions 190a, 190b each have upwardly and downwardly extending protrusions 210a, 212a, 210b, 212b (FIG. 5). The downward protrusions 212a, 212b include a longitudinally extending threaded bore hole 214.

Leading and trailing bushing assemblies 230a, 230b are received within the corresponding leading and trailing recesses 200a, 200b. The bushing assemblies 230a, 230b include resiliently deformable cylindrical bushings 232a, 232b, inner jackets 234a, 234b disposed radially inside the bushings 232a, 232b and outer jackets 236a, 236b disposed radially outside the bushings 232a, 232b. The bushings 232a, 232b are made of a resilient material, selected from, for example, an elastomer, a rubber- or a silicon-based material. The inner and outer jackets 234a, 234b, 236a, 236b are made of a metallic material, such as steel, and are fixedly connected to the inner and outer surfaces of the bushings 232a, 232b. The fixed connection means that the inner and outer jackets 234a, 234b, 236a, 236b cannot slip or rotate with respect to their corresponding surface of the bushings 232a, 232b. In some embodiments, the bushings 232a, 232b and the inner and outer jackets 234a, 234b, 236a, 236b are fixedly connected using known bonding techniques. The bushings 232a, 232b have a thickness that is greater than that of the inner jackets 234a, 234b or the outer jackets 236a, 236b. However, the thickness of the bushings 232a, 232b and of the inner and outer jackets 234a, 234b, 236a, 236b may vary from what is shown in the Figures.

Referring to FIGS. 5 and 6, the leading bushing assembly 230a is located within the leading recess 200a. Similarly, the trailing bushing assembly 230b is located within the trailing recess 200b. Washers 240a, 240b are disposed between the leading and trailing bushing assemblies 230a, 230b and the shoulders 202a, 202b respectively. In some embodiments, the washers 240a, 240b could be made of a wear resistant and low friction material. The washers 240a, 240b may reduce ingress of debris and dirt within the recesses 200a, 200b and may facilitate removal of the bushing assemblies 230a, 230b from the recesses 200a, 200b under some circumstances. A plate 250a is connected to the front end of the leading frame portion 190a, and a plate 250b is connected to the rear end of the trailing frame portion 190b. In some embodiments, the plates 250a, 250b could also made of a wear resistant and low friction material. Each plate 250a, 250b has a through hole 252 (FIG. 8) allowing passage for a fastener 253 that is connectable to the threaded bore hole 214. The plates 250a, 250b further have a slotted hole 254 and a shoulder portion 256 extending around the slotted hole 254. The shoulder portion 256 of the plate 250a extends rearwardly from the plate 250a towards the front end of the bushing assembly 230a, and the shoulder portion 256 of the plate 250b extends forwardly from the plate 250b towards the rear end of the bushing assembly 230b. When fasteners connect the plates 250a, 250b to the leading and trailing portions 190a, 190b of the primary frame member 170, the bushing assemblies 230a, 230b extend between their corresponding plate 250a, 250b and washer 240a, 240b. As such, the bushing assemblies 230a, 230b cannot slide longitudinally in their respective recess 200a, 200b.

Referring to FIGS. 6 to 8, the outer jacket 236b is fixedly connected to the trailing portion 190b of the primary frame member 170 within the recess 200b. The fixed connection of the outer jacket 236b to the trailing portion 190b provides that the outer jacket 236b is prevented from rotating with respect to the trailing portion 190b. The fixed connection of the outer jacket 236b with the trailing portion 190a is provided by press-fitting the bushing assembly 230b into the recess 200b. It is contemplated that the outer surface of the outer jacket 236b could also be bonded to the surface of the trailing portion 190b defining the recess 200b. It is also contemplated that the outer surface of the outer jacket 236b could include a longitudinally extending protrusion defining a key, and that the surface of the trailing portion 190b defining the recess 200b could include a corresponding longitudinally extending slot, the protrusion and the recess forming a keyed connection preventing the rotation of the outer jacket 236b with respect to the surface of the trailing portion 190b defining the recess 200b. Similarly, the outer jacket 236a is fixedly connected to the leading portion 190a in the leading recess 200a. The fixed connection of the outer jacket 236a to the leading portion 190a provides that the outer jacket 236a is prevented from rotating with respect to the leading portion 190a within the leading recess 200a.

Referring to FIGS. 5 to 8, the multi-member frame assembly 160 further includes a pivot 260 defined by leading and trailing pin assemblies 270a, 270b. The pin assemblies 270a, 270b shown in the Figures include pins 271 that are solid pins, but the pins 271 could be hollow pins in other embodiments. The trailing pin assembly 270b has an outer surface 272b and has leading and trailing portions 274b, 276b. The trailing pin assembly 270b is received within the trailing bushing assembly 230b as the leading portion 274b of the trailing pin assembly 270b is engaged to an inner surface 235b of the inner jacket 234b. A recess 280b is defined in the leading portion 274b of the trailing pin assembly 270b. The trailing pin assembly 270b extends through the slotted hole 254 of the plate 250b and extends parallel to the longitudinal axis 204. As best seen in FIG. 8, the slotted hole 254 has a major axis 255 extending vertically with respect to the track system 40 and perpendicular to the longitudinal axis 204. The leading pin assembly 270a is received within the leading bushing assembly 230a as a trailing portion of the leading pin assembly 270b is engaged to an inner surface 235a of the inner jacket 234a. A recess 280a is defined in the trailing portion of the leading pin assembly 270a. The leading pin assembly 270a extends through the slotted hole 254 of the plate 250a and extends parallel to the longitudinal axis 204. Again, the slotted hole 254 has its major axis (not shown) extending vertically with respect to the track system 40 and perpendicular to the longitudinal axis 204. In other embodiments, the slotted hole 254 in the plates 250a, 250b could be circular.

It is contemplated that the bushing assemblies 230a, 230b and the pin assemblies 270a, 270b could differ from the ones shown in the Figures. For instance, the inner jacket 234b could be omitted and the bushing 232b could be integrally formed onto the leading portion 274b of the trailing pin 270b. In other embodiments, the outer jacket 236b could be omitted and the bushing 232b could be molded into the recess 200b.

The trailing portion 276b of the trailing pin assembly 270b supports a trailing frame member 290b that is part of the multi-member frame assembly 160. The trailing pin assembly 270b extends through an aperture 292b (FIGS. 6 and 7) defined in the trailing frame member 290b. The trailing frame member 290b is fixedly connected to the trailing pin assembly 270b by fasteners 294b extending through a head portion of the trailing pin assembly 270b and fastened to threaded bore holes (not shown) defined in the trailing frame member 290b. The trailing frame member 290b has two upwardly extending arms 296b and one downwardly extending arm 298b (FIG. 6). The downwardly extending arm 298b includes a pivot assembly 300b having an axis 302b (FIGS. 5 and 6). In other embodiments, the pivot assembly 300b could include spherical bearings. A trailing tandem arm 310b is pivotally connected to the trailing frame member 290b at the pivot assembly 300b. The trailing tandem arm 310b has rear and front portions 312b, 314b. The trailing tandem arm 310b extends longitudinally fore and aft of the pivot assembly 300b. The trailing support wheel axle assembly 392b is connected to the front portion 314b of the trailing tandem arm 310b.

It is contemplated that the configuration of the leading and trailing tandem arms 310a, 310b may differ from the one shown in the Figures. For instance, in some embodiments, a longitudinal distance between the pivot assembly 300b and the rear portion 312b could differ from another longitudinal distance between the pivot assembly 300b and the front portion 314b. As such, other configurations of the tandem arms 310a, 310b are contemplated and could be used for selecting a load distribution on each one of the leading and trailing idler and support wheel assemblies 360a, 360b, 390a, 390b under some conditions.

Figure 3:
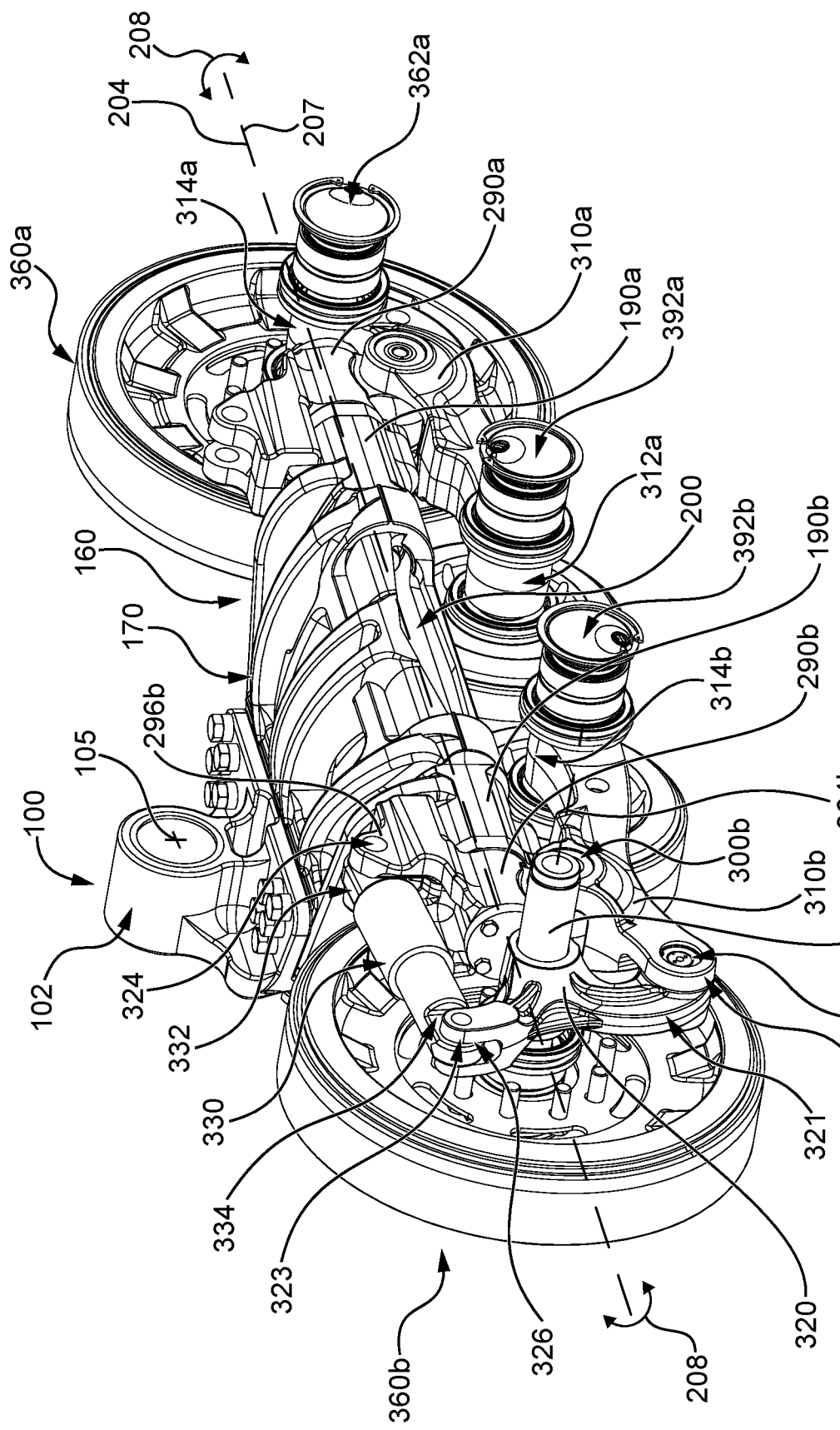
FIG. 3 is a perspective view taken from a rear, top, right side of the track system of FIG. 2, with the endless track removed.
Figure 4:
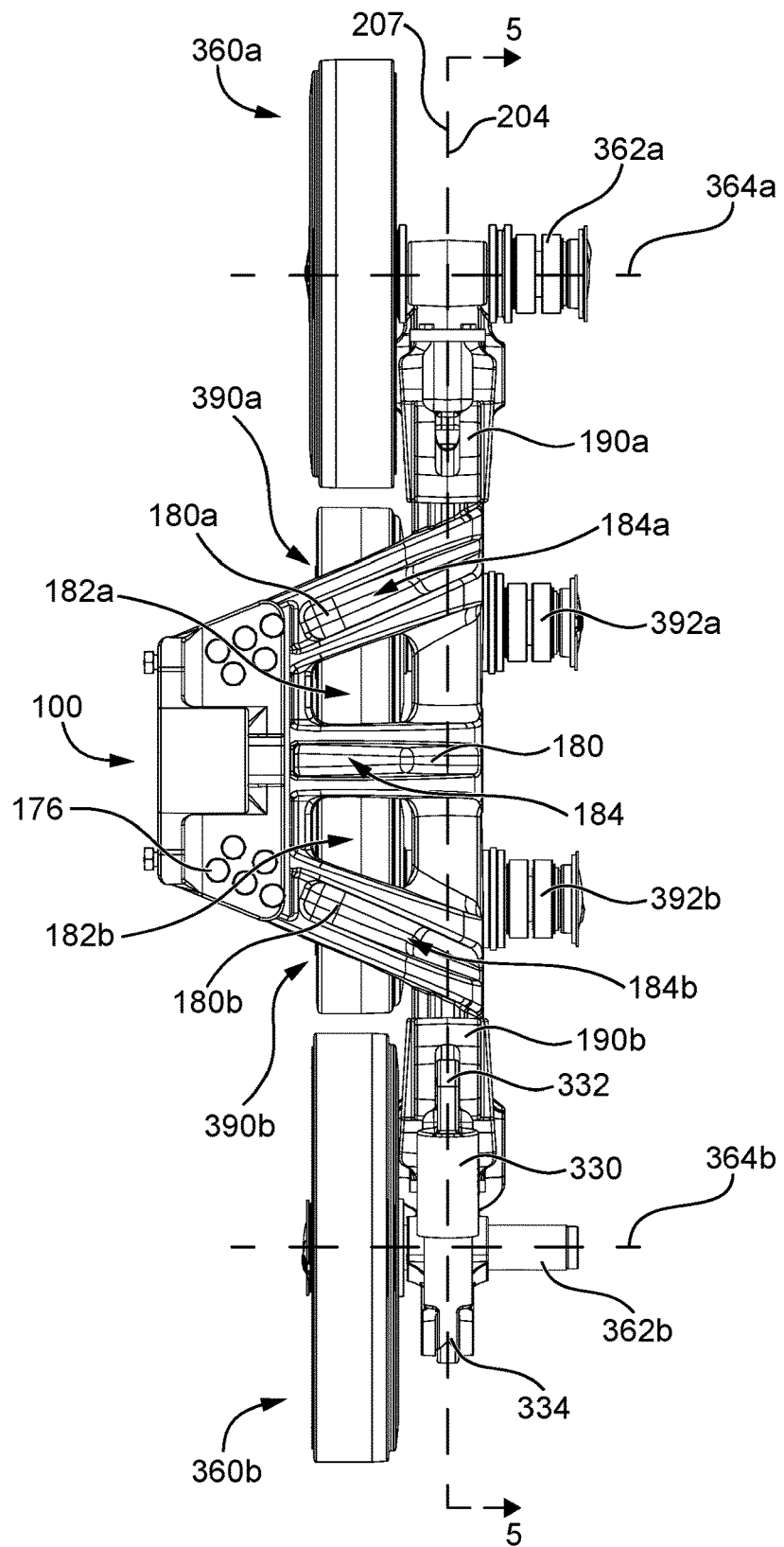
FIG. 4 is a top plan view of the track system of FIG. 3.

Referring to FIGS. 3 to 5, the trailing idler wheel axle assembly 362b defines an axis 364b. The trailing idler wheel axle assembly 362b and the axis 364b are transverse to the longitudinal axis 204. A wheel linkage 320 (FIG. 3) is operatively connected to the trailing idler wheel axle assembly 362b. The wheel linkage 320 has first and second portions 321, 323 positioned respectively below and above the trailing idler wheel axle assembly 362b. The first portion 321 is rotatably connected to the trailing tandem arm 310b at a pivot assembly 322 connected to the rear portion 312b. The tensioner 330 has first and second ends 332, 334. The first end 332 is rotatably connected to the arms 296b of the trailing frame member 290b at a pivot assembly 324. Having the tensioner 330 disposed above the trailing idler axle assembly 362b may assist in preventing debris from impacting the tensioner 330 when the track system 40 is in use. The second end 334 of the tensioner 330 is rotatably connected to the second portion 323 of the wheel linkage 320 at a pivot assembly 326. The pivot assembly 322 is downwardly offset from the axis 364b, and the pivot assembly 326 is upwardly offset from the axis 364b. The pivots 322, 326 are angularly displaced around the axis 364b such that the wheel linkage 320 forms a lever with the pivot 322 being the fulcrum thereof. The tensioner 330 and the wheel linkage 320 bias the trailing axle assembly 362b and the trailing idler wheel assembly 360b downwardly and towards the trailing end of the track system 40. The tensioner 330 selectively adjusts a tension in the endless track 480. Under some conditions, increasing the tension in the endless track 480 may assist in reducing the deformation of the endless track 480 under the wheel assemblies 360a, 360b, 390a, 390b when the track system 40 travels. Thus, under some conditions, increasing the tension in the endless track 480 may assist in reducing a rolling resistance of the track system 40. In other circumstances, decreasing the tension in the endless track 480 may facilitate removal and replacement of the endless track 480.

Referring now to FIGS. 3, 5 and 8, the leading pin assembly 270a supports a leading frame member 290a that is also part of the multi-member frame assembly 160. The leading pin assembly 270a extends through an aperture 292a defined in the leading frame member 290a. The leading frame member 290a is fixedly connected to the leading pin assembly 270a by fasteners 294a extending through a head portion of the leading pin assembly 270a and fastened to threaded bore holes (not shown) defined in the leading frame member 290a. The leading frame member 290a has one downwardly extending arm 298a (FIG. 5). The downwardly extending arm 298a includes a pivot assembly 300a having an axis 302a. In other embodiments, the pivot assembly 300a could include spherical bearings. A leading tandem arm 310a is pivotally connected to the leading frame member 290a at the pivot assembly 300a. The leading tandem arm 310a has rear and front portions 312a, 314a. The leading tandem arm 310a extends longitudinally fore and aft of the pivot assembly 300a. The leading support wheel assembly 390a includes a leading support wheel axle assembly 392a (FIGS. 3 and 4) that is connected to the rear portion 312a of the leading tandem arm 310a. A leading idler wheel axle assembly 362a defining an axis 364a is connected to the front portion 314a of the leading tandem arm 310a. The leading idler wheel axle assembly 362a and the axis 364a are transverse to the longitudinal axis 204. In other embodiments, it is contemplated that the track system 40 could have more than one support wheel assembly operatively connected to the leading and/or trailing tandem arms 310a, 310b.

Referring now to FIGS. 1A to 8, the motion dynamics of the track system 40 when travelling will be described. As mentioned above, when the track system 40 is connected to the axle 64 of the vehicle 60 and when the track system 40 travels on a longitudinally inclined surface, such as a slope, the entire track system 40 can pivot about the axis 105 to adopt a positive or negative pitch angle. When the track system 40 travels over a bump or a hole, the leading idler wheel assembly 360a can rise and fall as the front portion 314a of the leading tandem arm 310a is movable upwardly and downwardly because of the pivot assembly 300a. When the bump or the hole is under the leading support wheel assembly 390a, the rear portion 312a of the leading tandem arm 310a is movable upwardly and downwardly because of the pivot assembly 300a. When the bump or the hole is under the trailing support wheel assembly 390b, the front portion 314b of the trailing tandem arm 310b is movable upwardly and downwardly because of the pivot assembly 300b. When the bump or the hole is under the trailing idler wheel assembly 360b, the rear portion 312b of the trailing tandem arm 310b is movable upwardly and downwardly because of the pivot assemblies 300b, 322, 324, 326. By having the leading and trailing idler wheel assemblies 360a, 360b and the leading and trailing support wheel assemblies 390a, 390b rotatably connected at the front and rear portions of the tandem arms 310a, 310b, the tandem arms 310a, 310b act as levers. When the track system 40 travels over the bump or into the hole, each one of the wheel assemblies 360a, 360b, 390a, 390b can rise and fall independently. Thus, the vertical displacement of the primary frame member 170 is likely reduced compared to some other track systems having the idler and support wheel assemblies rotatably connected to the frame.

When the track system 40 travels on an uneven ground surface, the idler and support wheel assemblies 360a, 360b, 390a, 390b may move upwardly and downwardly repeatedly. This may induce vibrations in the leading and trailing frame members 290a, 290b and in their corresponding pin assemblies 270a, 290b. The vibrations induce the pin assemblies 270a, 290b to move vertically up and down repeatedly. Because of the clearance provided by the slotted holes 254 in the plates 250a, 250b and the resilience of the bushings 232a, 232b in a radial direction 206 (FIG. 8), the pin assemblies 270a, 270b are vertically movable along the major axis 255. It is to be noted that, in the present embodiment, the clearance provided by the slotted holes 254 in the plates 250a, 250b does not permit transversal displacement of the pin assemblies 270a, 270b, but this could be the case in other embodiments where the holes 254 would be circular. When the pin assemblies 270a, 270b move vertically up and down repeatedly, the bushings 232a, 232b are resiliently deformed in the radial direction 206 and they may dampen some of the vibrations transmitted by the pin assemblies 270a, 270b to the primary frame member 170. Thus, under some conditions, the amount of vibrations transmitted from the leading and trailing frame members 290a, 290b to the primary frame member 170 can be reduced because of the damping action of the bushing assemblies 230a, 230b.

Referring to FIGS. 1C and 3, when the track system 40 travels on a transversally inclined ground surface G shown in FIG. 1C, which is a ground surface that is inclined transversely with respect to the longitudinal axis 204 and that represents an example of a road defining a crown, the leading and trailing idler and support wheel assemblies 360a, 360b, 390a, 390b are tilted laterally outwardly, which causes the leading and trailing frame members 290a, 290b and their corresponding pin assembly 270a, 270b to rotate about a bushing axis 207, as schematically indicated by arrows in FIG. 3. The bushing axis 207 is defined by the cylindrical inner surfaces 235a, 235b, and the bushing axis 207 extends coaxial with the axes of the cylindrical inner surfaces 235a, 235b. In the Figures, the bushing axis 207 is coaxial with the longitudinal axis 204, but the axes 204, 207 could extend parallel or be skewed with respect to each other under some conditions as will be described below. Because the pin assemblies 270a, 270b are engaged to the inner jackets 234a, 234b and the outer jackets 236a, 236b are fixedly connected to the primary frame member 170, a torque is applied to the bushings 232a, 232b, which causes the bushings 232a, 232b to be resiliently deformed in a circumferential direction 208 (FIGS. 3 and 8). In other words, the bushings 232a, 232b are subjected to torsion forces about the bushing axis 207 as their inner jackets 234a, 234b are rotated with respect to the outer jackets 236a, 236b (respectively). The leading and trailing idler and support wheel assemblies 360a, 360b, 390a, 390b of the track system 40 are thus capable of pivoting with respect to the primary frame member 170, and such pivoting corresponds to a roll motion about the bushing axis 207. This roll motion is represented by angle θ in FIG. 1C. In some embodiments, the bushings 232a, 232b can withstand circumferential deformations of up to about 10 degrees, that is angle θ equals to about 10 degrees, but larger or smaller angles θ are contemplated in different embodiments.

Referring to FIGS. 1D and 3, when the track system 40 travels on a transversally inclined ground surface G' shown in FIG. 1D, which is a ground surface that is inclined transversely with respect to the longitudinal axis 204 and that defines a shallow ditch (or a trench), the leading and trailing idler and support wheel assemblies 360a, 360b, 390a, 390b are tilted laterally inwardly, and the track system 40 is capable of a roll motion about the bushing axis 207 represented by angle −θ in FIG. 1D. As such, the track system 40 has a range of roll motion about the bushing axis 207 from about −10 degrees to 10 degrees. Furthermore, it is to be understood that when the vehicle 60 travels on a transversally inclined ground surface such as ground surfaces G, G' which also happen to be uneven, the bushing assemblies 230a, 230b can be deformed simultaneously in the circumferential direction 208 and in the radial direction 206 by the pin assemblies 270a, 270b engaged thereto. Therefore, it is to be understood that the bushing axis 207 of the bushing assemblies 230a, 230b may be displaced from the longitudinal axis 204 under some conditions as the bushing assemblies 230a, 230b are resiliently deformed in the radial direction 206, and thus the bushing axis 207 may extend parallel to the longitudinal axis 204 or be skewed with respect to the longitudinal axis 204.

In addition, because of the resilient properties of the bushings 232a, 232b, the bushing assemblies 230a, 230b bias the pin assemblies 270a, 270b back to their rest position with respect to the primary frame member 170. The rest position corresponds to having the pin assemblies 270a, 270b rotated about the bushing axis 207 by about 0 degrees, that is angle θ equals about 0 degrees, when the track system 40 is attached to the chassis 62, the vehicle 60 is in its operating condition, is at rest, is unloaded, and is disposed on flat level ground.

Referring to FIGS. 2 to 8, in the track system 40, it is to be noted that each of the leading and trailing frame members 290a, 290b and their corresponding pin assembly 270a, 270b rotate independently about the longitudinal axis 204. Thus, the leading idler and support wheel assemblies 360a, 390a can be rotated about the longitudinal axis 204 independently of the trailing idler and support wheel assemblies 360b, 390b. By having each one of the idler and support wheel assemblies 360a, 360b, 390a, 390b capable of rotating about the longitudinal axis 204, the track system 40 can, under some conditions, maintain a more uniform contact of the endless track 480 with the ground surface and accommodate flexing and twisting of the endless track 480 when the track system 40 travels on changing terrain contours. The rotation of the idler and support wheel assemblies 360a, 360b, 390a, 390b about the longitudinal axis 204 may also assist in reducing wear of the tread 488 of the endless track 480 in the inward regions thereof when the track system 40 travels on a terrain such as the ground surface G of FIG. 1C. In addition, it is contemplated that, in some conditions, the leading and trailing pin assemblies 270a, 270b could be connected together by a rod assembly (not shown in this embodiment) received in and engaged to the recesses 280a, 280b (FIG. 5) defined in the pin assemblies 270a, 270b. When the rod assembly would be connected to the leading and trailing pin assemblies 270a, 270b, the leading and trailing pin assemblies 270a, 270b would act as a single pin assembly, and the leading and trailing frame members 290a, 290b could pivot in unison about the longitudinal axis 204.

It is also to be noted that using the bushing assemblies 230a, 230b described above compared to using conventional bearings has the advantage of not requiring installing seals between the plates 250a, 250b and the bushing assemblies 230a, 230b as debris and dirt do not affect the radial and circumferential resilient deformation of the bushings 232a, 232b. Thus, using the bushing assemblies 230a, 230b may assist in reducing the maintenance costs of the track system 40 compared to other track systems using conventional bearings.

Referring now to FIGS. 9 to 13, a second embodiment of the track system 1040 is illustrated. The track system 1040 includes some elements that are the same as or similar to those described with reference to the track system 40. Therefore, for simplicity, elements of the track system 1040 that are the same as or similar to those of the track system 40 have been labeled with the same reference numerals, and will not be described again in detail, unless mentioned otherwise.

Figure 13:
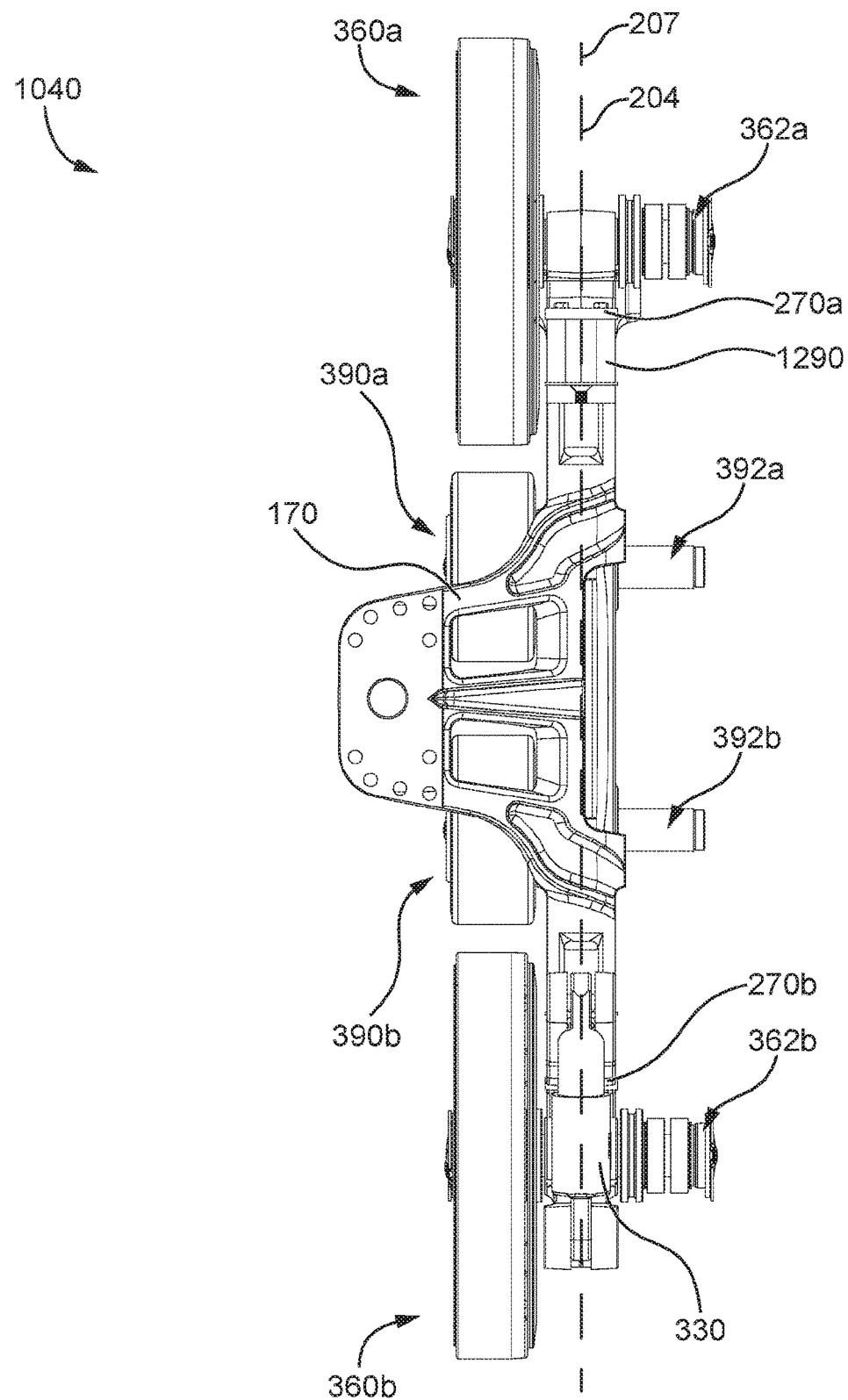
FIG. 13 is a top plan view of the track system of FIG. 12.
Figure 14:
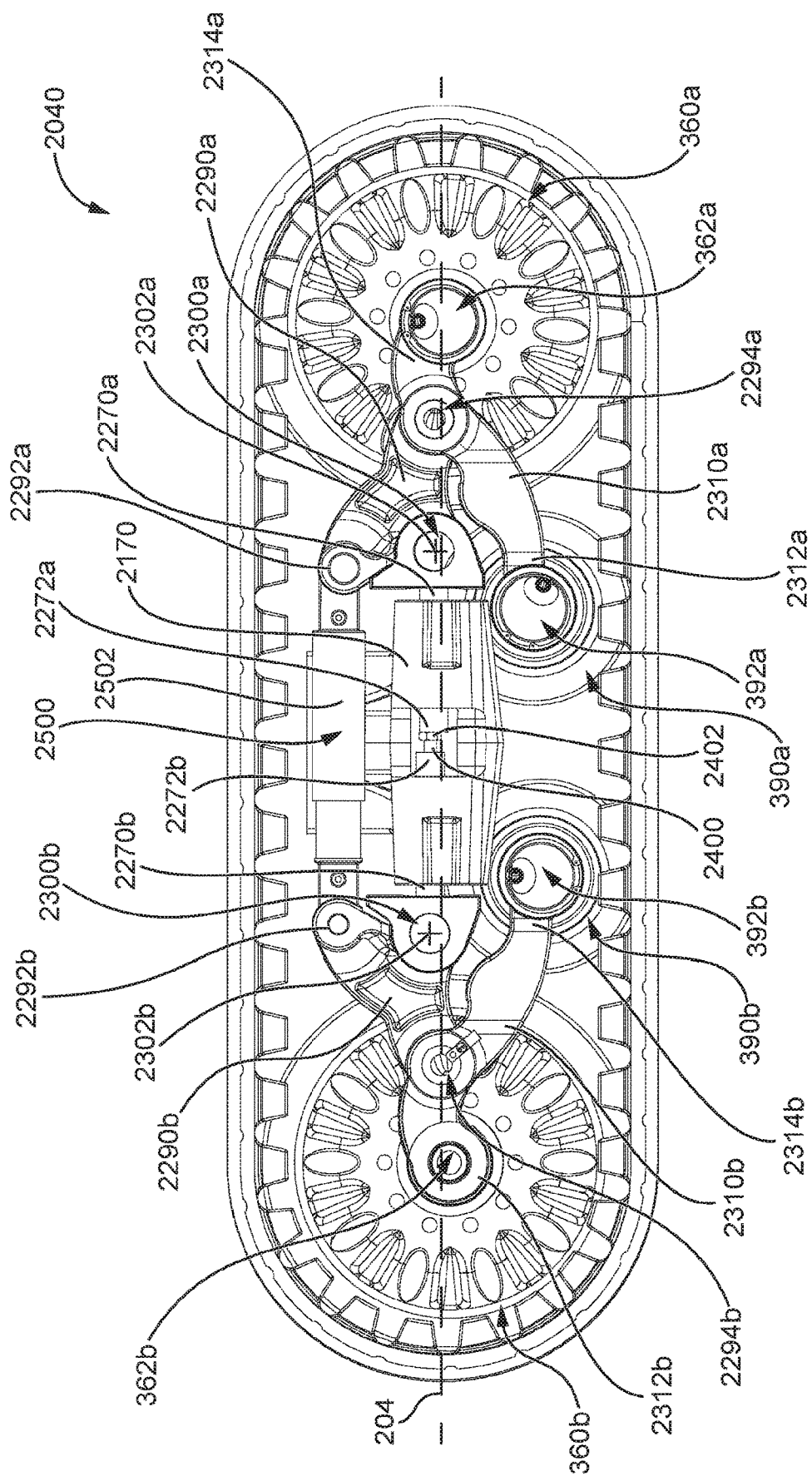
FIG. 14 is a right side elevation view of a track system in accordance with a third embodiment of the present technology and being configured to be operatively connected to a right side of a towed vehicle, with the attachment assembly removed, and the right leading and trailing idler and support wheels removed.
Figure 15:
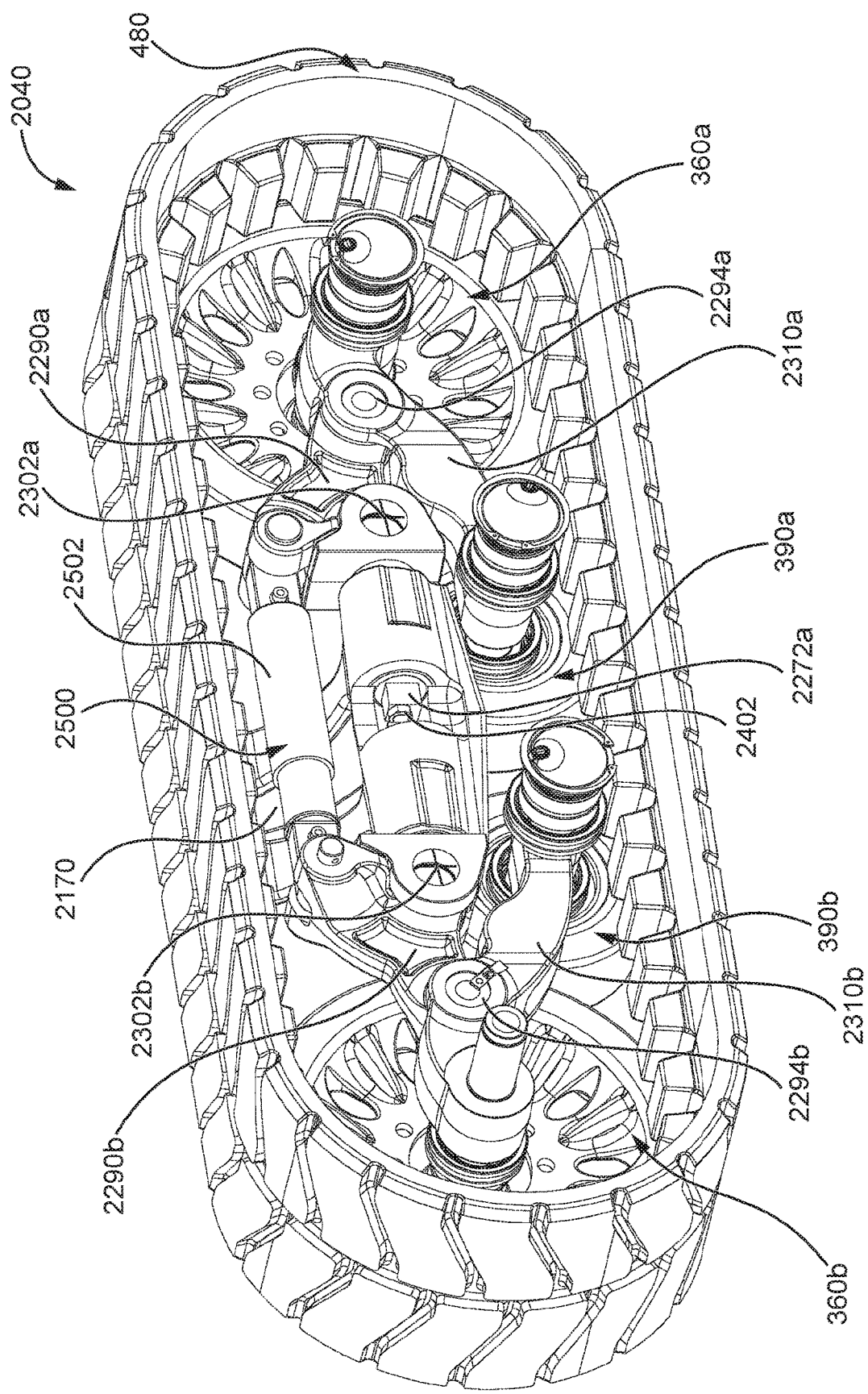
FIG. 15 is a perspective view taken from a rear, top, right side of the track system of FIG. 14.
Figure 16:
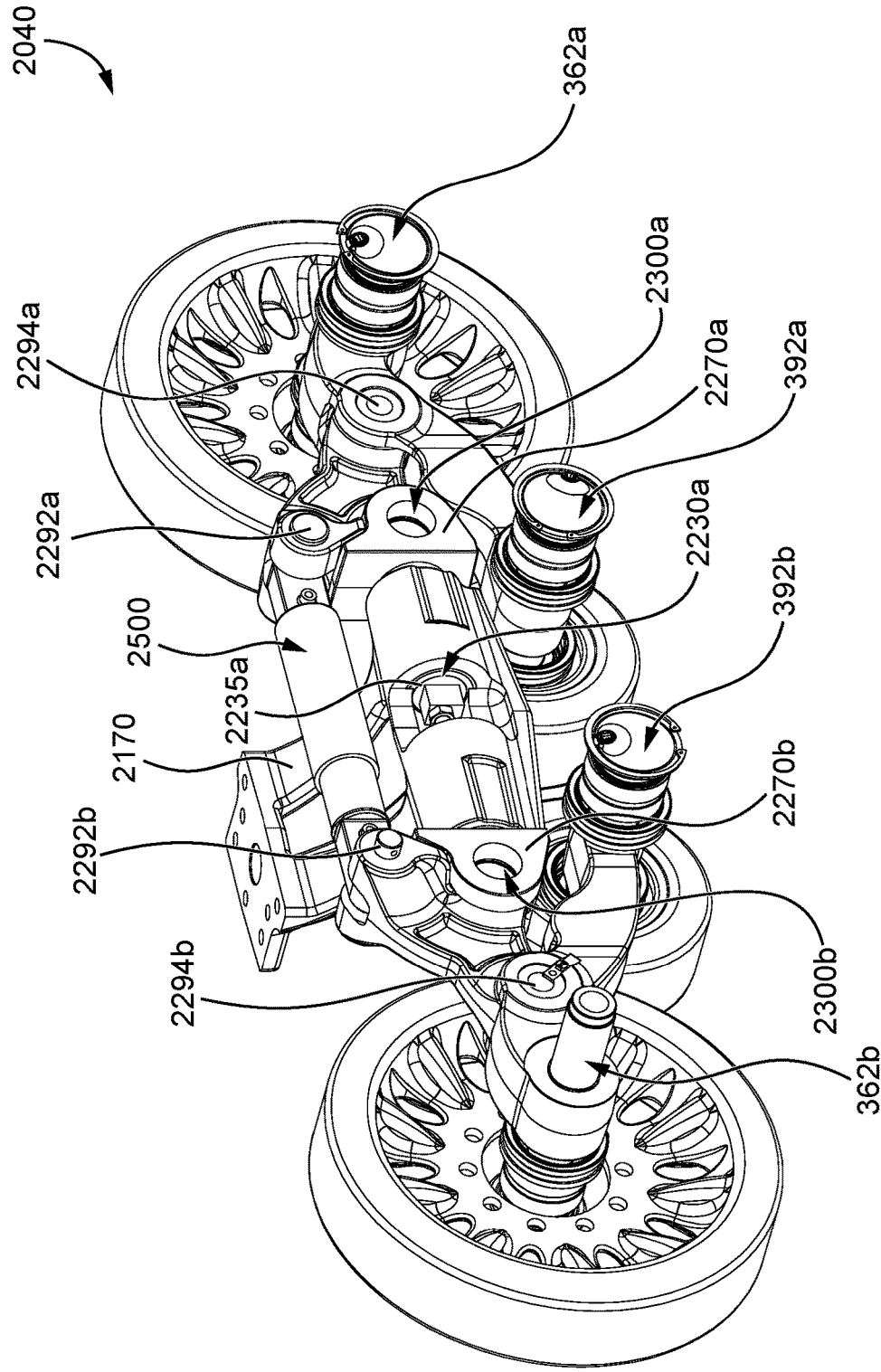
FIG. 16 is a perspective view taken from a rear, top, right side of the track system of FIG. 14, with the endless track removed.
Figure 17:
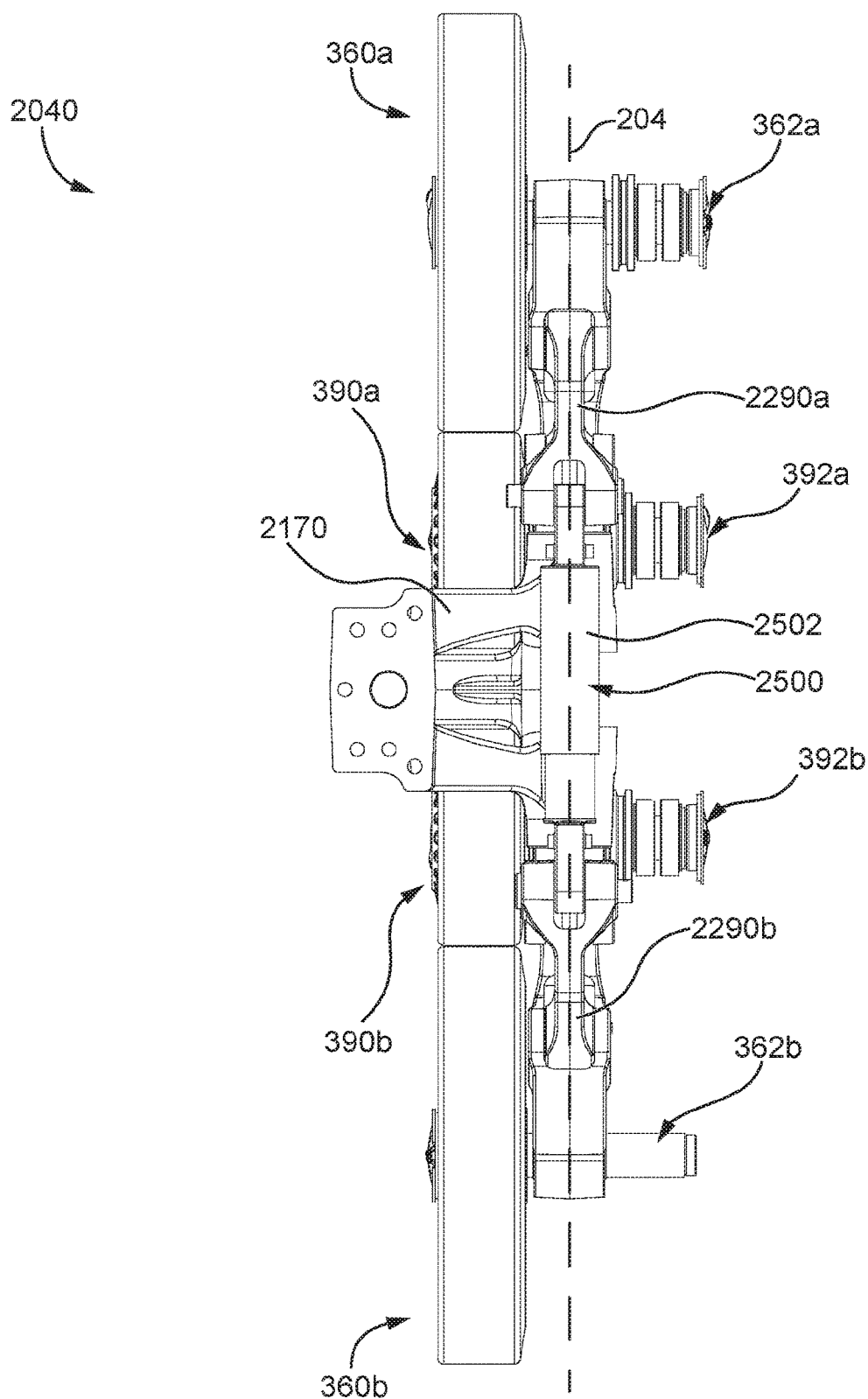
FIG. 17 is a top plan view of the track system of FIG. 16.

In the track system 1040, the leading and trailing frame members 290a, 290b, and the leading and trailing tandem arms 310a, 310b are replaced by a single wheel-bearing frame member 1290. This feature may assist in allowing embodiments of the track system 1040 to be efficiently mechanically packaged, in embodiments where such is judged to be important. The wheel-bearing frame member 1290 extends longitudinally and is connected to the leading and trailing pin assemblies 270a, 270b (FIG. 13). The pivot assemblies 322, 324 are connected to the wheel-bearing frame member 1290. The wheel linkage 320 is rotatably connected to the pivot assembly 322, and the tensioner 330 is rotatably connected to the pivot assembly 324. The trailing idler wheel axle assembly 362b is operatively connected to the wheel linkage 320. The leading and trailing support wheel axle assemblies 392a, 392b are operatively connected to the wheel-bearing frame member 1290. The leading idler wheel axle assembly 362a is also operatively connected to the wheel-bearing frame member 1290. The wheel-bearing frame member 1290 extends longitudinally between the pivot 322 and the leading idler wheel axle assembly 362a. In some embodiments, one or more additional support wheel assemblies could be disposed intermediate the leading and trailing support wheel assemblies 390a, 390b and operatively connected to the wheel-bearing frame member 1290.

Since each one of the leading and trailing idler and support wheel assemblies 360a, 360b, 390a, 390b is operatively connected to the wheel-bearing frame member 1290, the wheel assemblies 360a, 360b, 390a, 390b pivot in unison with respect to the primary frame member 170 when a torque is applied to the leading and/or trailing pin assembly 270a, 270b about the longitudinal axis 204. Thus, in the track system 1040, there is no independent pivoting of the leading idler and support wheel assemblies 360a, 390a about the longitudinal axis 204 with respect to the trailing idler and support wheel assemblies 360b, 390b. In addition, the wheel assemblies 360a, 360b, 390a, 390b pivot in unison about the axis 105 (FIG. 9) defined by the attachment assembly 100 shown in FIGS. 1A to 8. Thus, when the track system 1040 travels over a bump, into a hole or on a slope, the leading and trailing idler and support wheel assemblies 360a, 360b, 390a, 390b may collectively pitch positively or negatively about the axis 105.

Referring to FIGS. 14 to 17, a third embodiment of the track system 2040 is illustrated. The track system 2040 includes some elements that are the same as or similar to those described with reference to the track system 40. Therefore, for simplicity, elements of the track system 2040 that are the same as or similar to those of the track system 40 have been labeled with the same reference numerals, and will not be described again in detail, unless mentioned otherwise.

The track system 2040 has a primary frame member 2170 having longitudinally extending recesses for receiving the bushing assemblies (only the bushing assembly 2230a is shown in FIGS. 14 to 17) as described above with reference to the primary frame member 170. Leading and trailing pin assemblies 2270a, 2270b differ from the pin assemblies 270a, 270b in that they each have a pivot 2300a, 2300b defined in the head portion thereof. The pin assemblies 2270a, 2270b are slidably engaged to the corresponding inner surfaces only the inner surface 2235a is shown) and are movable within their corresponding bushing assembly 2230a along the bushing axis 207.

Still referring to FIGS. 14 to 17, the pivot 2300a has an axis 2302a and the pivot 2300b has an axis 2302b. A leading frame member 2290a is pivotally connected to the leading pin assembly 2270a at the pivot 2300a Similarly, a trailing frame member 2290b is pivotally connected to the trailing pin assembly 2270b at the pivot 2300b. The leading frame member 2290a is pivotally connected to a damper assembly 2500 at a pivot 2292a. The pivot 2292a has a play in it to permit rotation of the leading frame member 2290a about the bushing axis 206 as the leading pin assembly 2270a deforms the leading bushing assembly 2230a in the circumferential direction 208. In other embodiments, the pivot 2292a could include a spherical bearing. The trailing frame member 2290b is pivotally connected to the damper assembly 2500 at a pivot 2292b. The pivot 2292b also has a play in it to permit rotation of the trailing frame member 2290b about the bushing axis 206 as the trailing pin assembly 2270a deforms the trailing bushing assembly 2230b in the circumferential direction 208. In other embodiments, the pivot 2292b could also include a spherical bearing.

The leading frame member 2290a is further pivotally connected to a leading tandem arm 2310a at a pivot 2294a. The leading idler wheel axle assembly 362a is operatively connected to a front portion 2314a of the leading tandem arm 2310a. The leading support wheel axle assembly 392a is operatively connected to a rear portion 2312a of the leading tandem arm 2310a. Similarly, the trailing frame member 2290b is pivotally connected to a trailing tandem arm 2310b at a pivot 2294b. The trailing idler wheel axle assembly 362b is operatively connected to a rear portion 2312b of the trailing tandem arm 2310b. The trailing support wheel axle assembly 392b is operatively connected to a front portion 2314b of the trailing tandem arm 2310b. It is thus to be understood that the leading tandem arm 2310a and the trailing tandem arm 2310b can pivot independently with respect to the primary frame member 2170.

It is contemplated that the positioning of the pivots 2294a, 2294b and the axes 2302a, 2302b could differ from what is shown in the Figures. For example, in other embodiments, a longitudinal distance between the axis 2302b and the pivot 2294b could differ from a longitudinal distance between the pivot 2294a and the axis 2302a. Furthermore, it is contemplated that the pivoting motion of the leading and trailing frame members 2290a, 2290b could be limited by stops (not shown) mounted to the primary frame member 2170 and/or to the leading and trailing tandem arms 2310a, 2310b.

A threaded rod 2400 is connected to a trailing end 2272a of the leading pin assembly 2270a and to a leading end 2272b of the trailing pin assembly 2270b. A nut 2402 is engaged to the threaded rod 2400. Moving the nut 2402 along the threaded rod 2400 permits to selectively adjust the spacing between the trailing end 2272a and the leading end 2272b as the pin assemblies 2270a, 2270b slide longitudinally with respect to their respective bushing assemblies 2230a, 2230b. Moving the nut 2402 thus selectively adjusts the spacing between the axes 2302a, 2302b. Selectively adjusting the spacing between the axes 2302a, 2302b permits to selectively adjust the tension within the endless track 480. For example, when the spacing between the axes 2302a, 2302b is increased, the tension within the endless track 480 is increased. Other structures than the ones shown in the Figures are contemplated for selectively adjust the spacing between the axes 2302a, 2302b.

When the track system 2040 is connected to the axle 64 of the chassis 62 through the attachment assembly 100 (shown in FIG. 1A to 8), the load of the weight of the vehicle 60 and its payload is transferred, in turn, to the primary frame member 2170, to the leading and trailing pin assemblies 2270*a*, 2270*b* via the bushing assemblies 2230*a*, 2230*b*, to the pivots 2300*a*, 2300*b*, and on to the leading and trailing frame members 2290*a*, 2290*b*. As the load is applied, the pivots 2292*a*, 2292*b* tend to be pivoted downwardly about the axes 2302*a*, 2302*b*, and the pivots 2294*a*, 2294*b* tend to be pivoted upwardly about the axes 2302*a*, 2302*b*. The damper assembly 2500 is compressed between the pivots 2292*a*, 2292*b*. The damper assembly 2500 includes a hydro-pneumatic cylinder 2502. In other embodiments, the damper assembly 2500 could further include a coil spring. The damper assembly 2500 resists the compression induced at the pivots 2292*a*, 2292*b* and biases the pivots 2292*a*, 2292*b* away from each other. When the track system 2040 supports the load of the vehicle 60, the hydro-pneumatic cylinder 2502 provides for a damped pivotal motion of the leading and trailing frame members 2290*a*, 2290*b* with respect to each other about the axes 2302*a*, 2302*b*.

The positioning of the damper assembly 2500 between the upper portions of the leading and trailing frame members 2290*a*, 2290*b* allows for a relatively long stroke of the cylinder 2502 of the damper assembly 2500. As a result, the damping action of the damper assembly 2500 is generally more refined than in other track systems where the stroke of a damping cylinder is relatively shorter. Under some conditions, some of the vibrations that are caused by the unevenness of the ground surface on which the track system 2040 travels and that are transferred to the leading and trailing frame members 2290*a*, 2290*b* are dampened at least in part by the damper assembly 2500. As a result, the track system 2040 benefits from the combined actions of the damper assembly 2500, and of the bushing assemblies 2230*a*, 2230*b* that can deform along the radial direction 206 to dampen and/or absorb vibrations induced by the ground surface G, as described above. Moreover, when the track system 2040 travels over a bump or into a hole, each one of the wheel assemblies 360*a*, 360*b*, 390*a*, 390*b* can rise and fall independently, and the pivotal motion of the leading and trailing frame members 2290*a*, 2290*b* is dampened by the damper assembly 2500.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

The invention claimed is:

1. A track system for use with a towed vehicle having a chassis and an axle extending laterally outwardly from the chassis suitable for connection to the track system, the track system comprising:
  an attachment assembly rotatably connectable to the axle of the vehicle;
  a multi-member frame assembly disposed laterally outwardly from the attachment assembly, configured to be pivotable about the axle of the vehicle, and the multi-member frame assembly including:
    a primary frame member connected to the attachment assembly;
    at least one wheel-bearing frame member pivotably connected to the primary frame member about a pivot located within a recess; and
  at least one resilient bushing assembly located within the recess and engaging the pivot, the at least one bushing assembly being resiliently deformable in a circumferential direction to permit pivoting of the pivot with respect to the recess, the at least one resilient bushing assembly being fixedly connected within the recess to resiliently bias the pivot towards a rest position with respect to the recess;
  a leading idler wheel assembly rotatably connected to the at least one wheel-bearing frame member, the leading idler wheel assembly pivoting with respect to the primary frame member with the at least one wheel-bearing frame member;
  a trailing idler wheel assembly rotatably connected to the at least one wheel-bearing frame member, the trailing idler wheel assembly pivoting with respect to the primary frame member with the at least one wheel-bearing frame member; and
  an endless track extending around the primary frame member, the at least one wheel-bearing frame member, and the leading and trailing idler wheel assemblies.

2. The track system of claim 1, wherein the at least one wheel-bearing frame member is movable with respect to the primary frame member via resilient deformation of the at least one bushing assembly in a radial direction.

3. The track system of claim 2, further comprising a plate having a vertically extending slotted hole, the plate being connected to the primary frame member, the pivot extending through the slotted hole of the plate, and the at least one wheel-bearing frame member being vertically movable with respect to the primary frame member via the resilient deformation of the at least one bushing assembly in the radial direction.

4. The track system of claim 1, wherein the at least one wheel-bearing frame member is pivotable with respect to the primary frame member by an angle ranging between about −10 to +10 degrees with respect to the rest position.

5. The track system of claim 1, further comprising at least one support wheel assembly rotatably connected to the at least one wheel-bearing frame member, the at least one support wheel assembly being disposed intermediate the leading and trailing idler wheel assemblies, the at least one support wheel assembly pivoting with respect to the primary frame member with the at least one wheel-bearing frame member.

6. The track system of claim 1, wherein the primary frame member defines the recess, the recess extending along a longitudinal axis of the track system.

7. The track system of claim 6, wherein the at least one bushing assembly defines a bushing axis, the bushing axis being coaxial with the longitudinal axis.

8. The track system of claim 6, wherein:
  the recess is a leading recess,
  the pivot is a leading pivot defined by a leading pin assembly,
  the at least one resilient bushing assembly is a leading resilient bushing assembly,
  the leading resilient bushing assembly is located within the leading recess,
  the leading pin assembly has a first portion engaging an inner surface of the leading bushing assembly and a second portion extending outside of the leading recess, and
  the at least one wheel-bearing frame member is at least indirectly connected to the second portion of the leading pin assembly; and
  further comprising:

a trailing recess defined by the primary frame member, a trailing pin assembly defining a trailing pivot, the at least one wheel-bearing frame member pivotably connected to the primary frame member about the trailing pivot located within the trailing recess, a trailing resilient bushing assembly located within the trailing recess and engaging the trailing pivot, the at least one trailing resilient bushing assembly being resiliently deformable in a circumferential direction to permit pivoting of the trailing pivot with respect to the trailing recess, the trailing resilient bushing assembly being fixedly connected within the trailing recess to resiliently bias the trailing pivot towards a rest position with respect to the trailing recess, the trailing pin assembly having a first portion engaging an inner surface of the trailing resilient bushing assembly and a second portion extending outside of the trailing recess, and the at least one wheel-bearing frame member being at least indirectly connected to the second portion of the trailing pin assembly.

9. The track system of claim 8, wherein:

the at least one wheel-bearing frame member includes a leading wheel-bearing frame member and a trailing wheel-bearing frame member;

the leading wheel-bearing frame member is at least indirectly connected to the second portion of the leading pin assembly; and the trailing wheel-bearing frame member is at least indirectly connected to the second portion of the trailing pin assembly.

10. The track system of claim 9, wherein the leading and trailing wheel-bearing frame members are independently pivotable with respect to the primary frame member.

11. The track system of claim 10, wherein the leading and trailing wheel-bearing frame members are independently vertically movable with respect to the primary frame member.

12. The track system of claim 8, wherein the leading pin assembly is slidably engaged to the inner surface of the leading bushing assembly, and the trailing pin assembly is slidably engaged to the inner surface of the trailing bushing assembly.

13. The track system of claim 8, further comprising a threaded rod operatively connected to the first portions of the leading and trailing pin assemblies, and wherein the leading and trailing wheel-bearing frame members are pivotable together with respect to the primary frame member.

14. The track system of claim 8, wherein the multi-member frame assembly further includes:

a leading secondary frame member and a trailing secondary frame member;

the leading secondary frame member being connected between the leading pin assembly and the leading wheel-bearing frame member; and the trailing secondary frame member being connected between the trailing pin assembly and the trailing wheel-bearing frame member.

15. The track system of claim 14, wherein:

the leading wheel-bearing frame member is pivotably connected to the leading secondary frame member; and the trailing wheel-bearing frame member is pivotably connected to the trailing secondary frame member.

16. The track system of claim 14, further comprising a damper assembly pivotably connected between the leading secondary frame member and the trailing secondary frame member.

17. The track system of claim 1, wherein the at least one bushing assembly includes an inner jacket, an outer jacket and a resilient bushing disposed between the inner and outer jackets.

* * * * *